US012587323B2

(12) United States Patent
Sun et al.

(10) Patent No.: US 12,587,323 B2
(45) Date of Patent: Mar. 24, 2026

(54) MULTIPLE DEMODULATION REFERENCE SIGNAL (DMRS) PORTS IN A CODE DIVISION MULTIPLEXING (CDM) GROUP

(71) Applicant: Apple Inc., Cupertino, CA (US)

(72) Inventors: Haitong Sun, Cupertino, CA (US); Ankit Bhamri, Bad Nauheim (DE); Chunxuan Ye, San Diego, CA (US); Dawei Zhang, Saratoga, CA (US); Hong He, San Jose, CA (US); Huaning Niu, San Jose, CA (US); Seyed Ali Akbar Fakoorian, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 276 days.

(21) Appl. No.: 18/365,928

(22) Filed: Aug. 4, 2023

(65) Prior Publication Data

US 2024/0048300 A1 Feb. 8, 2024

Related U.S. Application Data

(60) Provisional application No. 63/396,153, filed on Aug. 8, 2022.

(51) Int. Cl.
*H04L 5/00* (2006.01)

(52) U.S. Cl.
CPC .......... *H04L 5/0016* (2013.01); *H04L 5/0051* (2013.01)

(58) Field of Classification Search
CPC ........................... H04L 5/0016; H04L 5/0053
See application file for complete search history.

(56) References Cited

U.S. PATENT DOCUMENTS

| | | | | |
|---|---|---|---|---|
| 2024/0163057 A1* | 5/2024 | Mei | ........................ | H04W 72/12 |
| 2024/0243875 A1* | 7/2024 | Mei | ........................ | H04L 5/0051 |
| 2024/0275653 A1* | 8/2024 | Zhang | .................... | H04L 5/0016 |
| 2025/0056556 A1* | 2/2025 | Jacobsson | ........... | H04W 72/231 |

OTHER PUBLICATIONS

International Patent Application No. PCT/US2023/029478, "International Preliminary Report on Patentability", Feb. 20, 2025, 12 pages.
3GPP A Global Initiative, "3rd Generation Patrnership Project; Technical Specification Group Radio Access Network; NR; Physical layer procedures for control (Release 17)," 3gPP TS 38.213 V17.2.0 (Jun. 2022), Jun. 23, 2022, 269 pages.

(Continued)

*Primary Examiner* — Derrick V Rose
(74) *Attorney, Agent, or Firm* — Kilpatrick Townsend & Stockton LLP

(57) ABSTRACT

The present application relates to devices and components including apparatus, systems, and methods that support multiple demodulation reference signal (DMRS) ports per code division multiplexing (CDM) group. In an example, a frequency domain orthogonal cover code (FD-OCC) of length three or six is used, thereby allowing at least six DMRS ports for DMRS configuration type 1 with a single symbol DMRS, at least twelve DMRS ports for DMRS configuration type 1 with a double symbol DMRS, at least nine DMRS ports for DMRS configuration type 2 with a single symbol DMRS, and at least eighteen DMRS ports for DMRS configuration type 2 with a double symbol DMRS.

20 Claims, 14 Drawing Sheets

(56)  References Cited

OTHER PUBLICATIONS

3GPP A Global Initiative, "3rd Generation Partnership Project; Technical Specification Group Radio Access Network; NR; Physical layer procedures for data (Release 17)," 3GPP TS 38.214 V17.2.0 (Jun. 2022), Jun. 23, 2022, 227 pages.
3GPP A Global Initiative, "3rd Generation Partnership Project; Technical Specification Group Radio Access Network; 3. NR; Medium Access Control (MAC) protocol specification (Release 17)," 3GPP TS 38.321V17.1.0(Jun. 2022), Jul. 20, 2022, 215 pages.
"Discussion on Increased Number of Orthogonal DMRS Ports" , 3GPP TSG RAN WG1 #109-e, R1-2204370 Available Online at: https://www.3gpp.org/dynareport?code=TDocExMtg--R1-109-e--60236.htm , 2022 , 7 pages.
"DM-RS Enhancements for Rel-18 NR" , 3GPP TSG RAN WG1 #109-e, R1-2204788 Available Online at: https://www.3gpp.org/dynareport?code=TDocExMtg--R1-109-e--60236.htm 2022 , 8 pages.
The International Application No. PCT/US2023/029478 , "International Search Report and the Written Opinion" , mailed Jan. 8, 2024, 17 pages.
The International Application No. PCT/US2023/029478 , "Invitation to Pay Additional Fees and, Where Applicable, Protest Fee" , mailed Nov. 17, 2023, 11 pages.

* cited by examiner

UE 104 gNB 108

100

Port 7  Port 9  Port 11
Port 6  Port 8  Port 10
Port 1  Port 3  Port 5
Port 0  Port 2  Port 4
FIG. 4
400
Port 5  Port 7
Port 4  Port 6
Port 1  Port 3
Port 0  Port 2
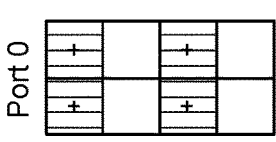
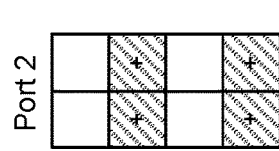
CDM group 0
CDM group1
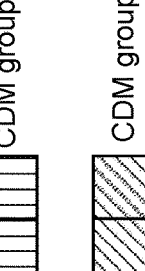
CDM group 2

620
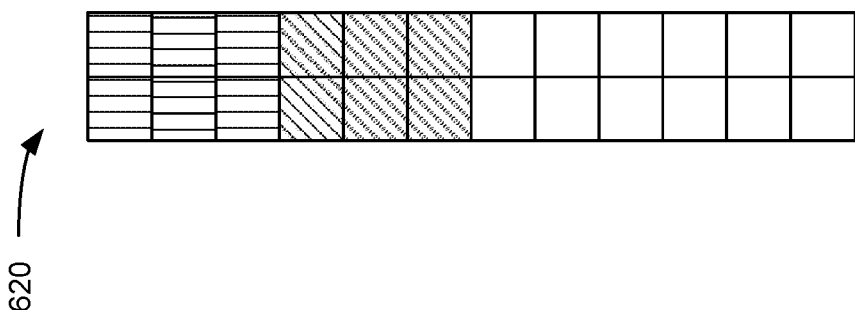
610
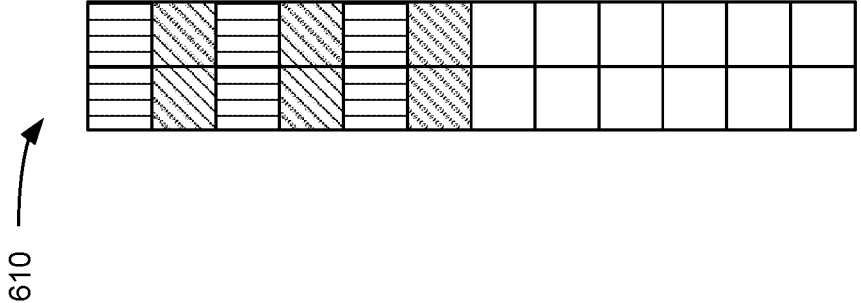
CDM group 0
CDM group1
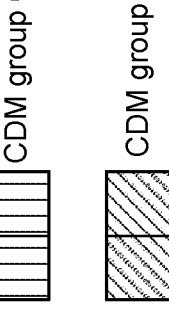
FIG. 6

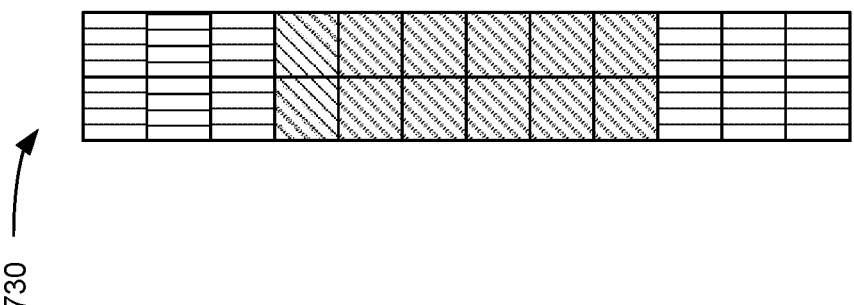
730
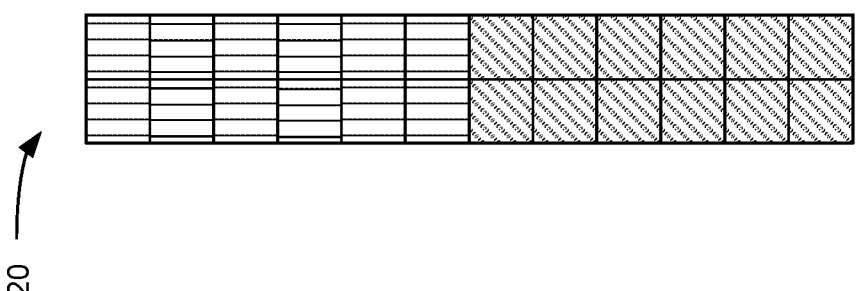
720
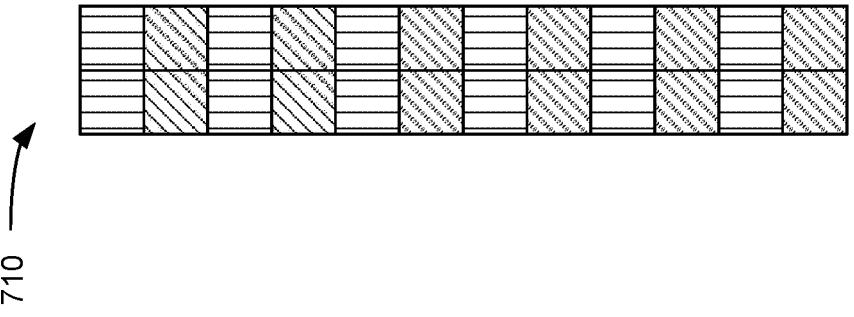
710
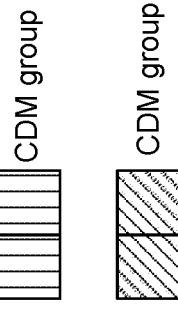
CDM group 0
CDM group1
FIG. 7

Figure 9:
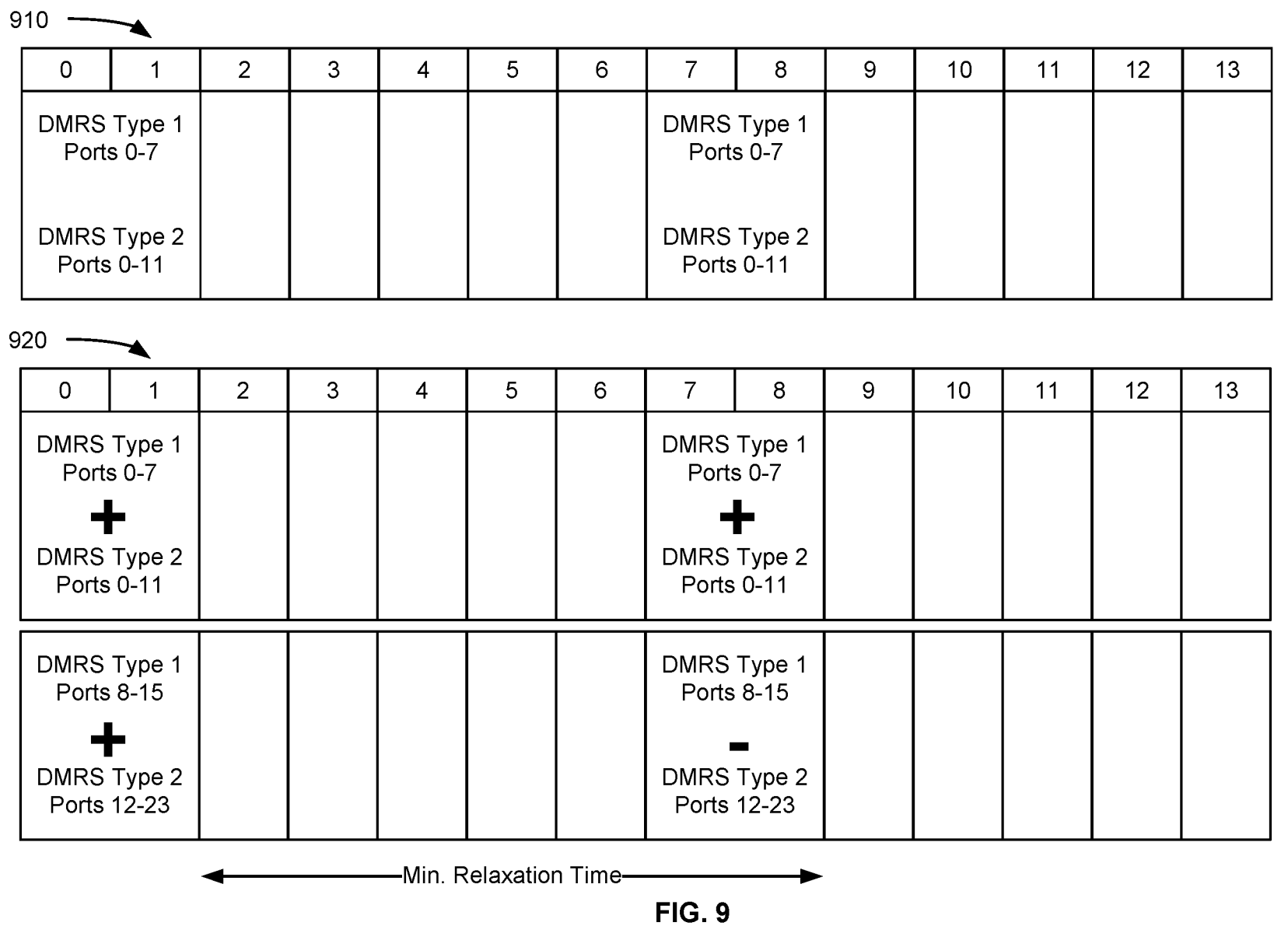

910

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| DMRS Type 1 Ports 0-7 | | | | | | | | DMRS Type 1 Ports 0-7 | | | | | |
| DMRS Type 2 Ports 0-11 | | | | | | | | DMRS Type 2 Ports 0-11 | | | | | |

920

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| DMRS Type 1 Ports 0-7 + | | | | | | | | DMRS Type 1 Ports 0-7 + | | | | | |
| DMRS Type 2 Ports 0-11 | | | | | | | | DMRS Type 2 Ports 0-11 | | | | | |

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| DMRS Type 1 Ports 8-15 + | | | | | | | | DMRS Type 1 Ports 8-15 - | | | | | |
| DMRS Type 2 Ports 12-23 | | | | | | | | DMRS Type 2 Ports 12-23 | | | | | |

◄——— Min. Relaxation Time ———►

Figure 10:
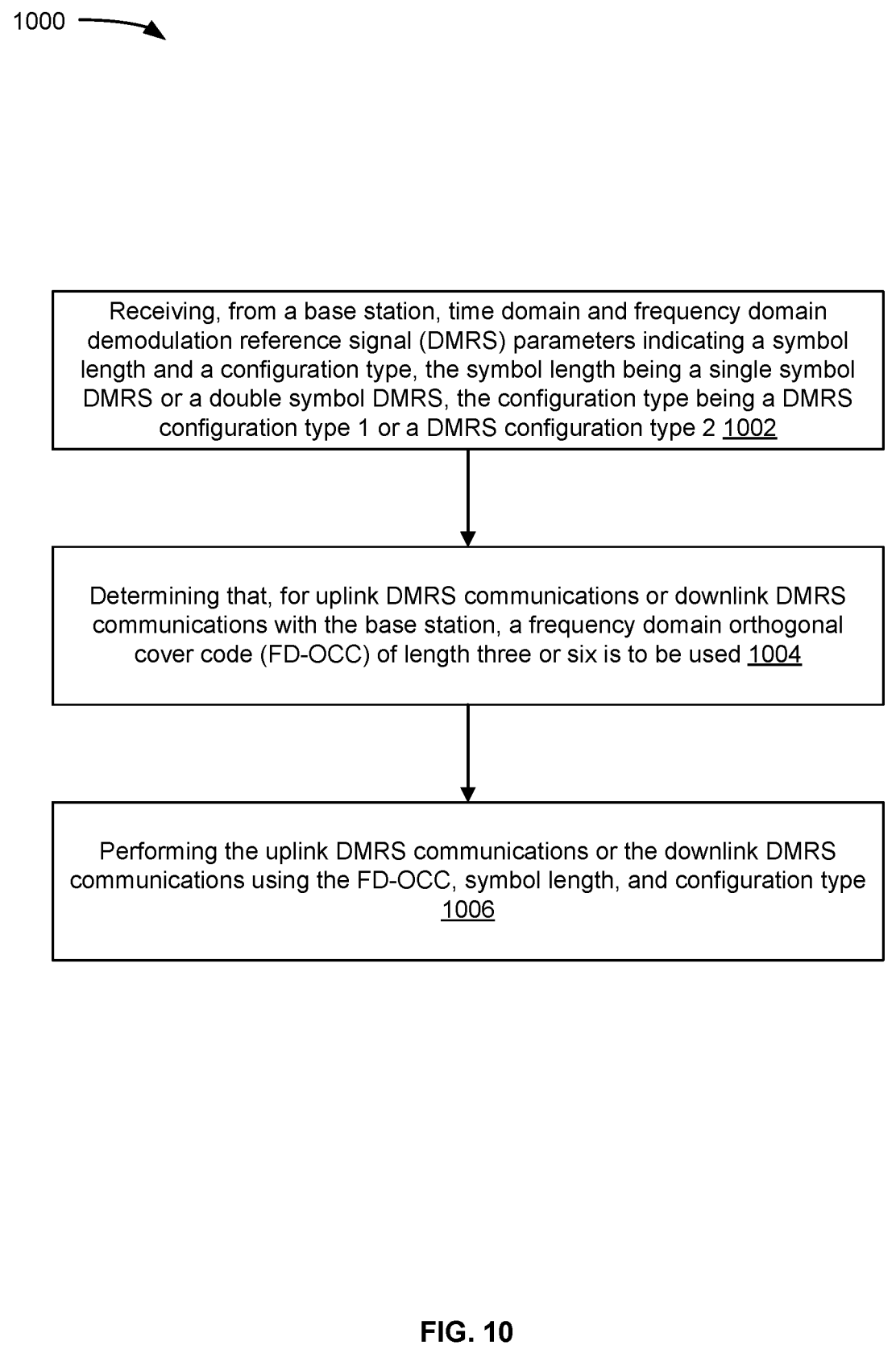

Receiving, from a base station, time domain and frequency domain demodulation reference signal (DMRS) parameters indicating a symbol length and a configuration type, the symbol length being a single symbol DMRS or a double symbol DMRS, the configuration type being a DMRS configuration type 1 or a DMRS configuration type 2 1002

Determining that, for uplink DMRS communications or downlink DMRS communications with the base station, a frequency domain orthogonal cover code (FD-OCC) of length three or six is to be used 1004

Performing the uplink DMRS communications or the downlink DMRS communications using the FD-OCC, symbol length, and configuration type 1006

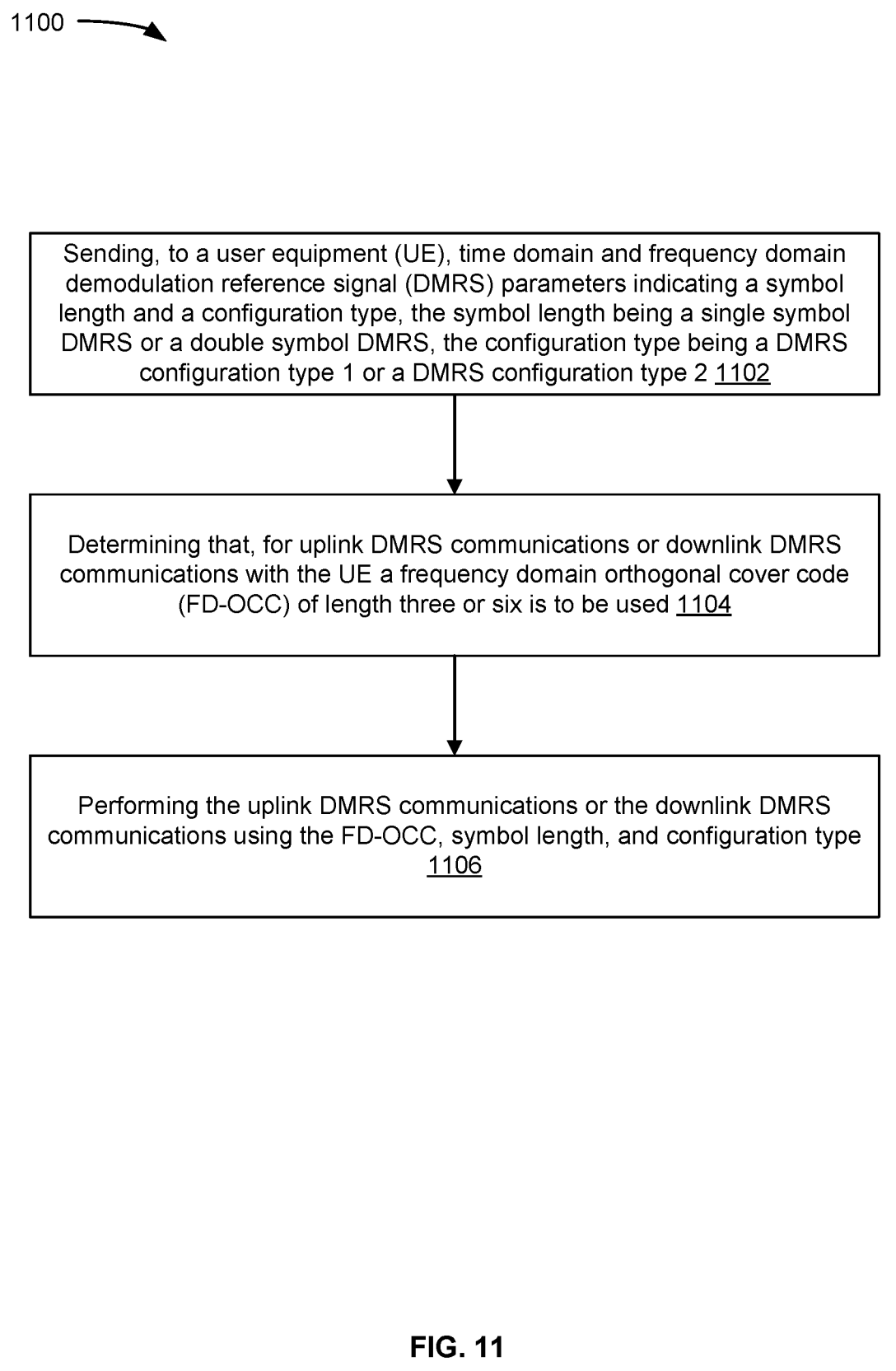

Sending, to a user equipment (UE), time domain and frequency domain demodulation reference signal (DMRS) parameters indicating a symbol length and a configuration type, the symbol length being a single symbol DMRS or a double symbol DMRS, the configuration type being a DMRS configuration type 1 or a DMRS configuration type 2 1102

↓

Determining that, for uplink DMRS communications or downlink DMRS communications with the UE a frequency domain orthogonal cover code (FD-OCC) of length three or six is to be used 1104

↓

Performing the uplink DMRS communications or the downlink DMRS communications using the FD-OCC, symbol length, and configuration type 1106

FIG. 11

MULTIPLE DEMODULATION REFERENCE SIGNAL (DMRS) PORTS IN A CODE DIVISION MULTIPLEXING (CDM) GROUP

CROSS REFERENCE TO RELATED APPLICATIONS

The present application claims the benefit and priority under 35 U.S.C. 119(e) of U.S. Provisional Patent Application No. 63/396,153, filed Aug. 8, 2022, entitled, "MULTIPLE DEMODULATION REFERENCE SIGNAL (DMRS) PORTS IN A CODE DIVISION MULTIPLEXING (CDM) GROUP," the content of which is herein incorporated by reference in its entirety for all purposes.

BACKGROUND

Cellular communications can be defined in various standards to enable communications between a user equipment and a cellular network. For example, Fifth generation mobile network (5G) is a wireless standard that aims to improve upon data transmission speed, reliability, availability, and more. A demodulation reference signal (DMRS) is a type of reference signals and is used to support different functions including, for instance, generating channel estimates for demodulation of an associated physical channel, where this channel can be used for data communications.

BRIEF DESCRIPTION OF THE DRAWINGS

FIG. 4 illustrates examples of DMRS ports, in accordance with some embodiments.

FIG. 6 illustrates examples of resource element distribution based on a DMRS configuration, in accordance with some embodiments.

FIG. 7 illustrates examples of resource element distribution based on a DMRS configuration, in accordance with some embodiments.

FIG. 9 illustrates another example of using time domain orthogonal cover codes, in accordance with some embodiments.

FIG. 10 illustrates an example of an operational flow/algorithmic structure implemented by a UE for DMRS communications, in accordance with some embodiments.

FIG. 11 illustrates an example of an operational flow/algorithmic structure implemented by a base station for DMRS communications, in accordance with some embodiments.

DETAILED DESCRIPTION

Figure 1:
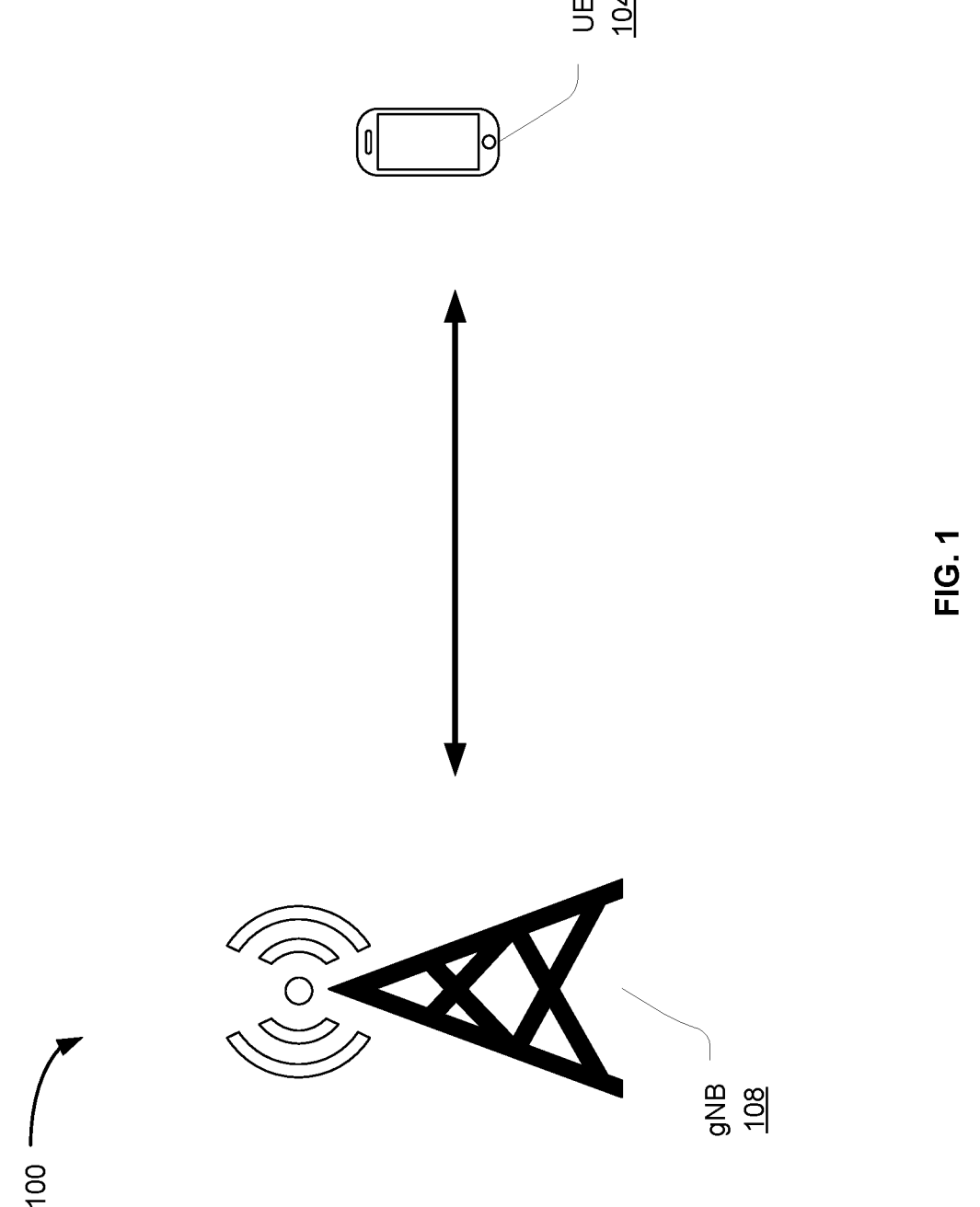
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art, having the benefit of the present disclosure, that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

An antenna port can be associated with a specific set of reference signals such that a channel over which a symbol is transmitted on that antenna port can be distinguished from another channel over which another symbol is conveyed on the same antenna port. In other words, the antenna port can be defined by its reference signal and can be associated with a specific channel model to help with, for instance, channel estimation and equalization. A demodulation reference signal (DMRS) is an example of a reference signal. An antenna port used for DMRS transmission and/or reception can be referred to as a DMRS antenna port (or DMRS port herein for conciseness).

Communication networks may use multiple DMRS antenna ports. To increase the number of such ports (e.g., for multi-user, multiple-input, multiple-output (MU-MIMO) technology) without necessarily increasing the related signaling overhead, a frequency domain orthogonal cover code (FD-OCC) of length three or six may be used, in addition to possibly using a time domain orthogonal cover code (TD-OCC) of length two or longer. Doing so can allow at least six DMRS ports for DMRS configuration type 1 with a single symbol DMRS, at least twelve DMRS ports for DMRS configuration type 1 with a double symbol DMRS, at least nine DMRS ports for DMRS configuration type 2 with a single symbol DMRS, and at least eighteen DMRS ports for DMRS configuration type 2 with a double symbol DMRS. Further, the length of three or six (e.g., a multiplier of three, instead of a multiplier of two) can support having multiple code division multiplexing (CDM) groups within a physical resource block (PRB) for at least DMRS configuration type 1. When TD-OCC is used for DMRS locations, a UE processing time may be relaxed, intra-slot frequency hopping may be disabled, and a locked phase may be used. These and other features of increasing the number of DMRS ports are further described herein below.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The "user equipment" or "UE" as used herein refers to a device with radio communication capabilities and may describe a remote user of network resources in a communications network. The term "user equipment" or "UE" may be considered synonymous to, and may be referred to as, client, device, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The UE may have a primary function of communication with another UE or a network and the UE may be integrated with other devices and/or systems (e.g., in a vehicle).

The term "base station" as used herein refers to a device with radio communication capabilities, that is a device of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications, such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include DMRSs for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission. The UE 104 can similarly transmit various reference signals to the gNB 108 including, for instance, DMRSs, for processing by the gNB 108 in association with uplink channels (e.g., a physical uplink control channel (PUCCH) and a physical uplink shared channel (PUSCH)).

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a PUCCH and a PUSCH. Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band, frequency range 2 (FR2) band, and/or high frequency range (FRH) band. The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

Although not illustrated in FIG. 1, the network environment 100 may further include multiple other UEs, with which the gNB 108 can connect in a similar manner as the gNB 108-UE 104 connection. The UE 104 can also connect with another UE by using sidelink channels. Further, although not illustrated in FIG. 1, the gNB 108 may include or control, at least in part, multiple transmission and reception points (TRPs). Different technologies can be supported including multiple-input, multiple-output (MIMO) technologies and MU-MIMO technologies.

Figure 2:
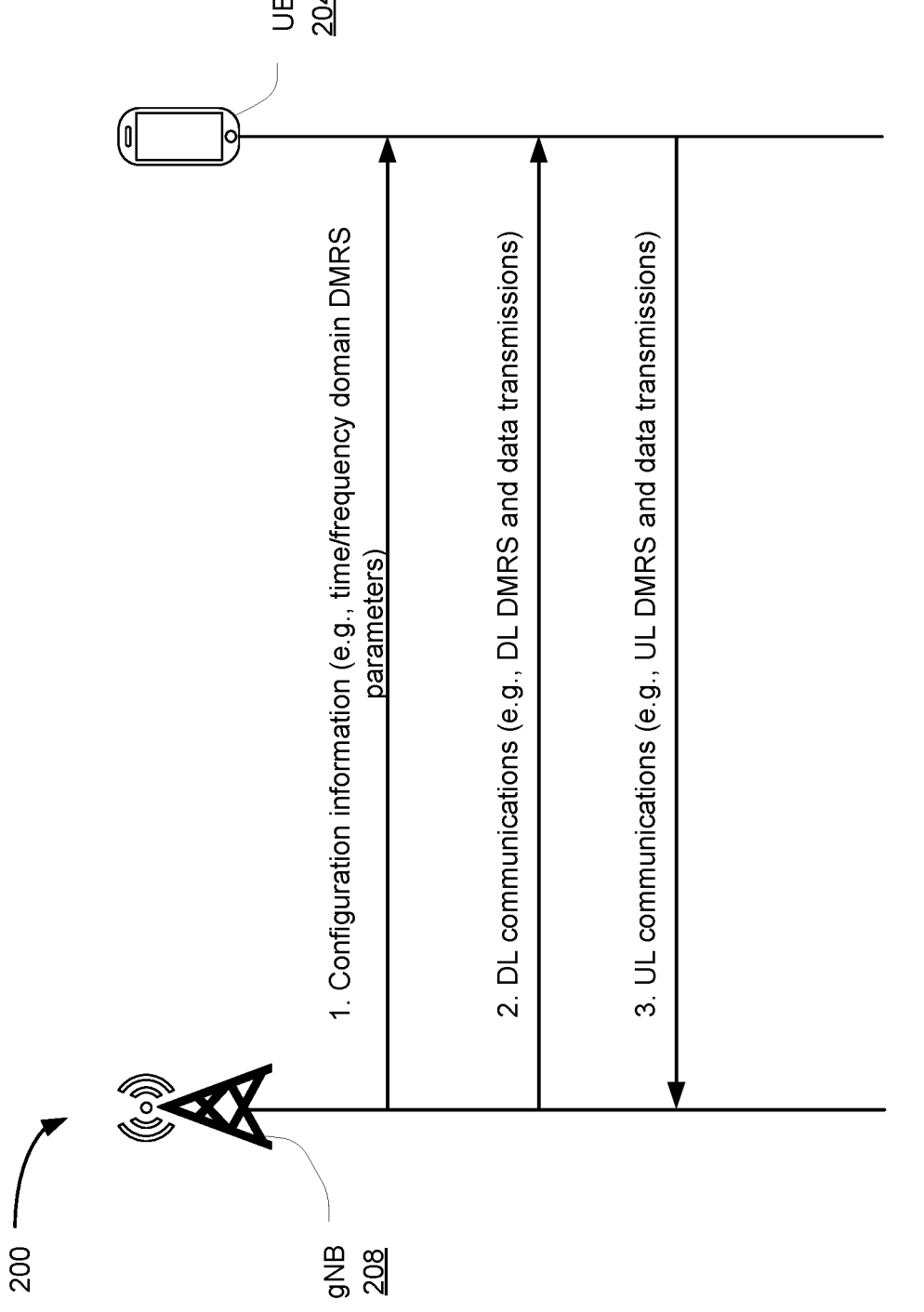
FIG. 2 illustrates an example of a sequence diagram between a base station and a user equipment (UE), in accordance with some embodiments.

FIG. 2 illustrates an example of a sequence diagram 200 between a base station and a UE 204 in accordance with some embodiments. The base station is illustrated as a gNB 208, which is an example of the gNB 108 of FIG. 1. The UE 204 is an example of the UE 104 of FIG. 1. The sequence diagram 200 includes the gNB 208 sending configuration information to the UE 204. Thereafter, downlink (DL) communications from the gNB 208 to the UE 204 and/or uplink (UL) communications from the UE 204 to the gNB 208 can occur based on the configuration information.

In an example, DL communications include DMRSs for one or more downlink channels (e.g., DMRSs for PDCCH and DMRSs sent for PDSCH). Such DMRSs can be received on DMRS ports of the UE 204 and can be used by the UE 204, among other things, for generating channel estimates for demodulation such that control information and data traffic sent on the downlink channel(s) can be processed by the UE 204. Conversely, UL communications include DMRSs for one or more uplink channels (e.g., DMRSs for PUCCH and DMRSs sent for PUSCH). Such DMRSs can be sent on DMRS ports of the UE 204 and can be used by the gNB 208, among other things, for generating channel estimates for demodulation such that control information and data traffic sent on the uplink channel(s) can be processed by the gNB 208.

The configuration information can indicate time domain and frequency domain DMRS parameters. Some or all of these parameters can be defined via radio resource control (RRC) signaling between the gNB 208 and the UE 204 and can indicate time domain and frequency domain resource allocations for DMRS.

For example, a DMRS is used for estimating the PDSCH radio channel. In this case, the time domain DMRS parameters define the DMRS OFDM symbol locations and can include a PDSCH symbol allocation, a mapping type, a DMRS type A position, a DMRS length, and an DMRS additional position. The symbol allocation of PDSCH indicates the OFDM symbol locations used by the PDSCH transmission in a slot. DMRS symbol locations fall within the PDSCH symbol allocation. The positions of DMRS OFDM symbols depend on the mapping type. The mapping type of PDSCH is either slot-wise (type A) or non-slot-wise (type B). For mapping type A, the DMRS OFDM symbol locations are defined relative to the first OFDM symbol of the slot. The location of the first is provided by the DMRS type A position. For any additional DMRS, the duration of OFDM symbols is the number of OFDM symbols between the first OFDM symbol of the slot and the last OFDM symbol of the allocated PDSCH resources. For mapping type B, the DMRS OFDM symbol locations are defined relative to the first OFDM symbol of allocated PDSCH resources. The first DMRS OFDM symbol location is the first OFDM symbol location of the allocated PDSCH resources. For any additional DMRS, the duration of OFDM symbols is the duration of the allocated PDSCH resources. The maximum number of DMRS OFDM symbols used by the UE 204 is configured by RRC signaling (dmrs-AdditionalPosition and maxLength). The maxLength RRC parameter configures the length of DMRS symbol, single symbol DMRS or double symbol DMRS. For double-symbol DMRS, the actual selection is signaled in DCI (e.g., a DCI format 1_1 message). The higher-layer parameter dmrs-AdditionalPosition defines the maximum number of additional single or double symbol DMRS transmitted. The number of additional positions is in the range of zero to three and depends on the mapping type, DMRS length, and PDSCH symbol allocation and is defined in, for example, 3GPP Technical Specification 38.211 V17.2.0 (2022 July), Table 7.4.1.1.2-3. 3GPP Technical Specification 38.211 V17.2.0 is incorporated herein by reference in its entirety.

Continuing with the DMRS for PDSCH example, the frequency domain parameters define the subcarrier locations of DMRS and include the DMRS configuration type and DMRS antenna ports. The configuration type indicates the frequency density of DMRS and is signaled by RRC message dmrs-Type. Configuration type 1 defines six subcarriers per physical resource block (PRB) per antenna port, comprising alternate subcarriers. Configuration type 2 defines four subcarriers per PRB per antenna port, consisting of two groups of two consecutive subcarriers. Different delta shifts are applied to the sets of subcarriers used, depending on the associated antenna port or code division multiplexing (CDM) group. For configuration type 1, two CDM groups are possible. For configuration type 2, three CDM groups are possible.

As such, the DL communications for PDSCH can include DMRS encoded in resources elements (subcarrier and symbol-wise) as set by the time domain and frequency domain DMRS parameters for the PDSCH, in addition to data encoded in other resource elements. For the UL communications (and considering the example of PUSCH), such communication can include DMRS encoded in resources elements (subcarrier and symbol-wise) as set by the corresponding time domain and frequency domain DMRS parameters for the PUSCH, in addition to data encoded in other resource elements.

Figure 3:
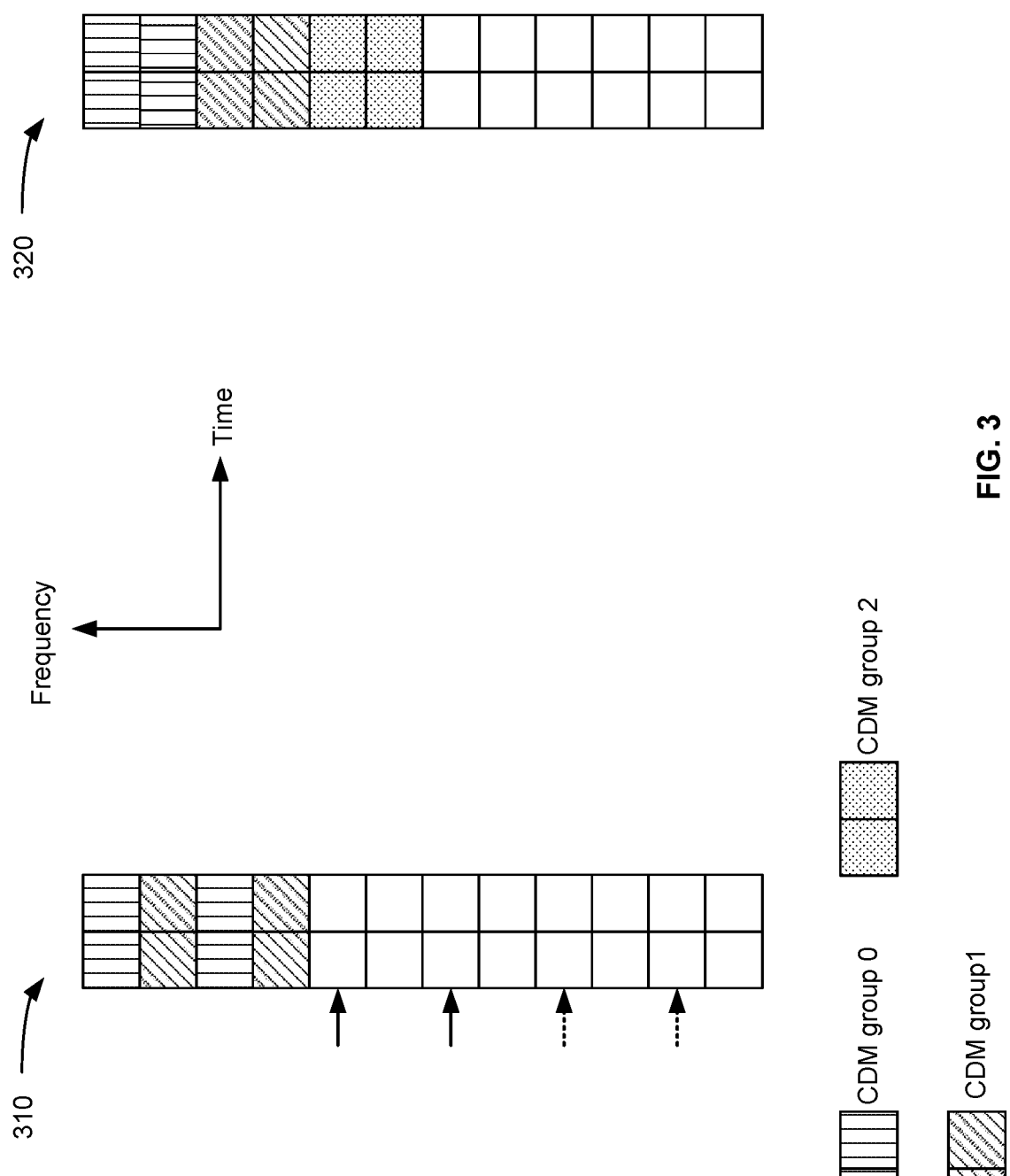
FIG. 3 illustrates examples of a demodulation reference signal (DMRS) configuration, in accordance with some embodiments.

FIG. 3 illustrates examples of a DMRS configuration, in accordance with some embodiments. Two examples are illustrated: a first DMRS configuration 310 that corresponds to a DMRS configuration type 1 with a double symbol DMRS, and a second DMRS configuration 320 that corresponds to a DMRS configuration type 2 with a double symbol DMRS.

Generally, the DMRS configuration type 1 can include a total of two CDM groups, shown in FIG. 3 as "CDM group 0" with vertically crossed rectangles and "CDM group 1" with diagonally crossed rectangles. With a double symbol DMRS (as illustrated in FIG. 3), eight DMRS ports can be supported (as shown in the next figure) with an FD-OCC of length two and a TD-OCC of length two, although this number of DMRS ports can be increased with a longer FD-OCC as further described herein below. In comparison, with a single symbol DMRS (not illustrated in FIG. 3), four DMRS ports can be supported with an FD-OCC of length two, although this number of DMRS ports can also be increased with a longer FD-OCC as further described herein below.

The DMRS configuration type 2 can include a total of three CDM groups, shown in FIG. 3 as "CDM group 0" with vertically crossed rectangles, "CDM group 1" with diagonally crossed rectangles, and "CDM group 2" with dot-filled rectangles. With a double symbol DMRS (as illustrated in FIG. 3), twelve DMRS ports can be supported (as shown in the next figure) with an FD-OCC of length two and a TD-OCC of length two, although this number of DMRS ports can be increased with a longer FD-OCC as further described herein below. In comparison, with a single symbol DMRS (not illustrated in FIG. 3), six DMRS ports can be supported with an FD-OCC of length, although this number of DMRS ports can also be increased with a longer FD-OCC as further described herein below.

In the illustration of FIG. 3 where a double symbol DMRS is used, each CDM group uses two resource elements in the frequency domain and two symbols in the time domain. This corresponds to using FD-OCC of length two in the frequency domain and TD-OCC of length two in the time domain. In this configuration, each CDM group supports four DMRS ports. In comparison, if a single symbol DMRS is used, each CDM group uses two resource elements in the frequency domain and one symbol in the time domain, which corresponds to using FD-OCC of length two in the frequency domain and no TD-OCC in the time domain. In this configuration, each CDM group supports two DMRS ports.

Further, each CDM group repeats in the frequency domain using next the entries in a DMRS sequence. For instance, and referring to the first configuration 310, a PRB of twelve subcarriers is shown. "CDM group 0" occupies the subcarriers twelve and ten as shown with the vertically crossed rectangles. These resource elements encode a first part of the DMRS sequence. Within the same PRB, "CDM group 0" can be repeated to occupy subcarriers eight and six (as illustrated with the two solid arrows pointing to these two resource elements in FIG. 3). These resource elements encode a second part of the DMRS sequence. Likewise, "CDM group 0" can be repeated again to occupy subcarriers four and two (as illustrated with the two dotted arrows pointing to these two resource elements in FIG. 3). These resource elements encode a third part of the DMRS sequence. Similar repetitions can be applicable to the other CDM group(s) and/or the second DMRS configuration 320.

FIG. 4 illustrates examples 400 of DMRS ports, in accordance with some embodiments. The left hand side of FIG. 4 shows eight DMRS ports (labeled "0" through "7") that correspond to the first DMRS configuration 310 of FIG. 3. The right hand side of FIG. 4 shows twelve DMRS ports (labeled "0" through "11") that correspond to the second DMRS configuration 320 of FIG. 3.

Referring to the first DMRS configuration 310, DMRS ports "0," "1", "4," and "5" correspond to "CDM group 0,"

whereas DMRS ports "2," "3", "6," and "7" correspond to "CDM group 1." A TD OCC of length two is used, whereby two TD-OCC sequences (e.g., {+1, +1} and {+1, −1}) are applied to the DMRS sequence.

Referring to the second DMRS configuration 320, DMRS ports "0," "1", "6," and "7" correspond to "CDM group 0," DMRS ports "2," "3", "8," and "9" correspond to "CDM group 1," and DMRS ports "4," "5", "10," and "11" correspond to "CDM group 2." A TD OCC of length two is used, whereby two TD-OCC sequences (e.g., {+1, +1} and {+1, −1}) are applied to the DMRS sequence.

Referring back to FIGS. 3 and 4, the maximum number of DMRS ports is eight and twelve for the DMRS configuration type 1 and the DMRS configuration type 2, respectively. However, a larger number of DMRS ports may be needed. For example, in the context of MU-MIMO with cyclic prefix orthogonal frequency division multiplexing (CP-OFDM), it may be desired to increase the maximum number of DMRS ports (e.g., to double it per DMRS configuration type) without increasing the DMRS overhead.

To do so, the same number of CDM groups can be used per configuration type. However, the TD-OCC length can be increased. If this length is increased by a multiplier of two, design challenges (e.g., vis-à-vis the DMRS overhead) can arise. In particular and referring to the DMRS configuration type 1 as illustrated by the first DMRS configuration 310 of FIG. 3, the repetition of CDM groups within a PRB can become challenging. For instance, with an FD-OCC length of four, each CDM group can support four DMRS ports with a single symbol DMRS or eight DMRS ports with a double symbol DMRS. This corresponds to four resource elements in the frequency domain. In other words, two CDM groups would be used, each using four resource elements in the frequency domain. However, only twelve resource elements exist in the frequency domain per PRB. As such, if the repetition occurs, at most one of the two CDM groups can be fully repeated within the PRB, thereby impacting how the different parts of a DMRS sequence can be transmitted.

Instead, embodiments of the present disclosure involve the use of FD-OCC having a length that is a multiplier of three (e.g., a length of three or six). Such an FD-OCC allows the repetition of all the CDM groups within a PRB, thereby supporting the transmission of different parts of a DMRS sequence without a DMRS overhead increase. Such embodiments are further described in FIGS. 5-8.

Further, embodiments of the present disclosure can use TD-OCC of length two or longer, where the corresponding TD-OCC sequences are applied to DMRS locations (whereas another TD-OCC can be applied to the DMRS symbols thereof). This additional use of TD-OCC can further increase the number of DMRS ports. Nonetheless, this TD-OCC use assumes some channel characteristic continuity over time and can necessitate multiple DMRS locations being processed before data can be processed. As such, UE processing time can be relaxed, whereas intra-slot frequency hopping can be disabled, and a locked phase can be used. Such embodiments are further described in FIG. 9.

Figure 5:
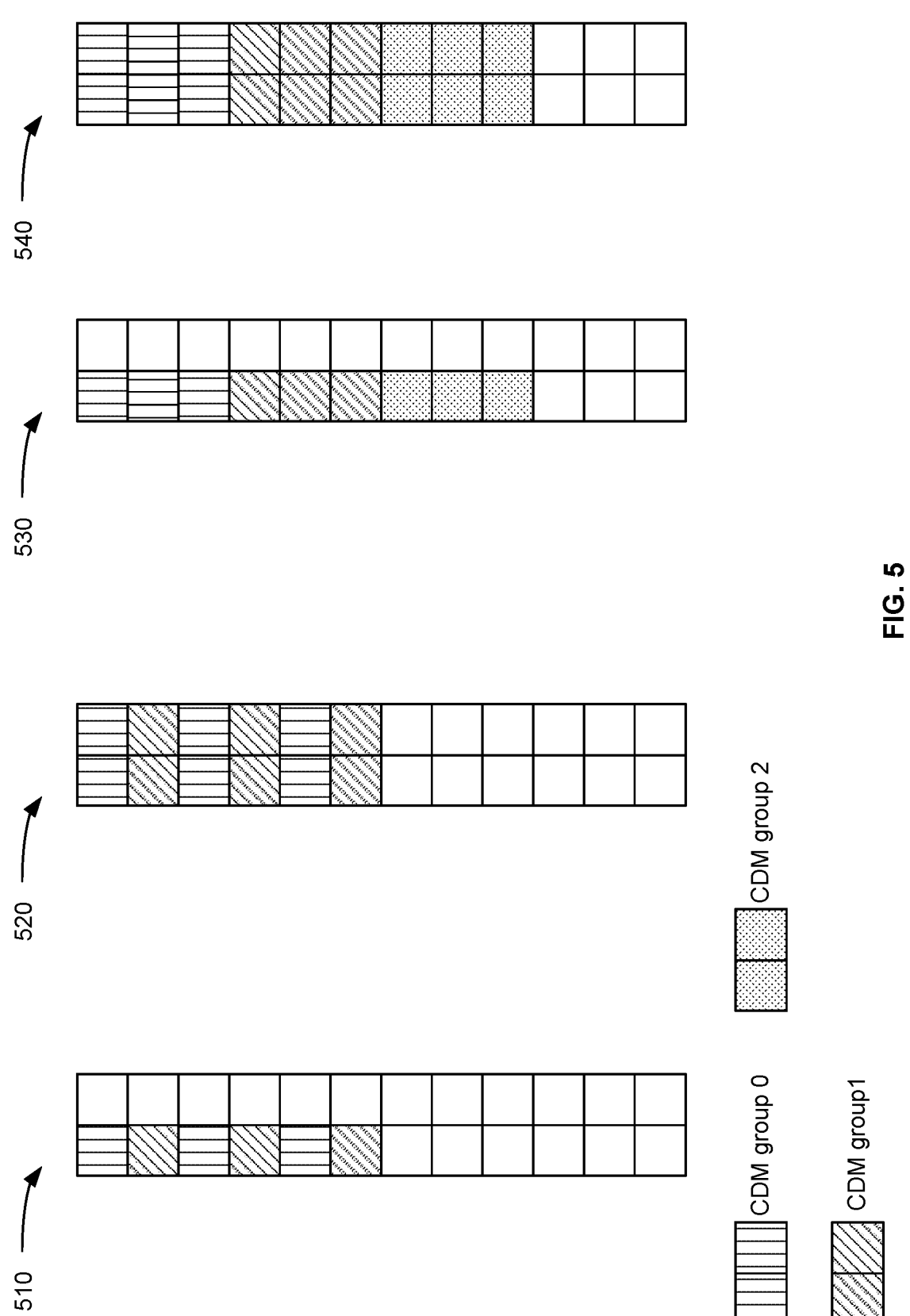
FIG. 5 illustrates examples of a DMRS configuration, in accordance with some embodiments.

FIG. 5 illustrates examples of a DMRS configuration, in accordance with some embodiments. Four examples are illustrated: a first DMRS configuration 510 that corresponds to a DMRS configuration type 1 with a single symbol DMRS, a second DMRS configuration 520 that corresponds to a DMRS configuration type 1 with a double symbol DMRS, a third DMRS configuration 530 that corresponds to a DMRS configuration type 2 with a single symbol DMRS, and a fourth DMRS configuration 540 that corresponds to a DMRS configuration type 2 with a double symbol DMRS.

The DMRS configuration type 1 continues to use a total of two CDM groups, shown in FIG. 5 as "CDM group 0" with vertically crossed rectangles and "CDM group 1" with diagonally crossed rectangles. With a single symbol DMRS (as illustrated by the first DMRS configuration 510), six DMRS ports can be supported with an FD-OCC of length three, although this number of DMRS ports can also be increased with a longer FD-OCC (e.g., of length six) as further described herein below. With a double symbol DMRS (as illustrated by in the second DMRS configuration 520), twelve DMRS ports can be supported with an FD-OCC of length three and a TD-OCC of length two, although this number of DMRS ports can be increased with a longer FD-OCC (e.g., of length six) as further described herein below.

The DMRS configuration type 2 can also include a total of three CDM groups, shown in FIG. 5 as "CDM group 0" with vertically crossed rectangles, "CDM group 1" with diagonally crossed rectangles, and "CDM group 2" with dot-filled rectangles. With a single symbol DMRS (as illustrated by the third DMRS configuration 530), nine DMRS ports can be supported with an FD-OCC of length three, although this number of DMRS ports can also be increased with a longer FD-OCC (e.g., of length six) as further described herein below. With a double symbol DMRS (as illustrated by the fourth DMRS configuration 540), eighteen DMRS ports can be supported with an FD-OCC of length three and a TD-OCC of length two, although this number of DMRS ports can be increased with a longer FD-OCC (e.g., of length six) as further described herein below.

When FD-OCC of length three is used along with a single symbol DMRS, each CDM group uses three resource elements in the frequency domain and one symbol in the time domain within a PRB prior to repetition. In this case, with DMRS configuration type 1, two CDM groups are used, whereas with DMRS configuration type 2, three CDM groups are used (e.g., each CDM group using three resource elements in the frequency domain and one symbol in the time domain).

When FD-OCC of length three is used along with a double symbol DMRS, each CDM group uses three resource elements in the frequency domain and two symbols in the time domain within a PRB prior to repetition. In this case, with DMRS configuration type 1, two CDM groups are used, whereas with DMRS configuration type 2, three CDM groups are used (e.g., each CDM group using three resource elements in the frequency domain and two symbols in the time domain).

FIG. 6 illustrates examples of resource element distribution based on a DMRS configuration, in accordance with some embodiments. The DMRS configuration is a DMRS configuration type 1 with a double symbol DMRS, whereby an FD-OCC of length three is used. As such, two CDM groups are used, each occupying three resource elements in the frequency domain and two symbols in the time domain within a PRB prior to repetition. Two example distributions are shown: a first distribution 610 and a second distribution 620.

In the first distribution 610, each CDM group takes either "K" even or "K" odd resource elements in the PRB. For instance, one CDM group occupies three of the even resource elements in the frequency domain, whereas the other CDM group occupies three of the odd resource elements in the frequency domain. In the illustration of FIG. 6, "CDM group 0" occupies the first three even resource elements of the PRB (e.g., at sub-carriers twelve, ten, and eight) before repetition. "CDM group 1" occupies the first three odd resource elements of the PRB (e.g., at sub-carriers eleven, nine, and seven) before repetition.

In the second distribution 620, each CDM group takes a consecutive number "K" of resource elements in the PRB. For instance, one CDM group occupies three contiguous resource elements in the frequency domain, whereas the other CDM group occupies the next three contiguous resource elements in the frequency domain. In the illustration of FIG. 6, "CDM group 0" occupies the top three resource elements of the PRB (e.g., at sub-carriers twelve, eleven, and ten) before repetition. "CDM group 1" occupies the next three resource elements of the PRB (e.g., at sub-carriers nine, eight, and seven) before repetition.

The first distribution 610 can provide better back-forward compatibility. For instance, the first distribution 610 may permit co-scheduling of legacy DMRS transmissions for a UE. In comparison, the second distribution can be more robust to frequency selective fading channels. In particular, because contiguous resource elements are used per CDM group, the variability of the channels across the subcarriers is reduced for the CDM group.

FIG. 7 illustrates examples of resource element distribution based on a DMRS configuration, in accordance with some embodiments. Three examples are illustrated and relate to using an FD-OCC of length six: a first DMRS configuration 710, a second DMRS configuration 720, and a third DMRS configuration 730, each of which corresponds to a DMRS configuration type 1 with a double symbol DMRS. The difference between these three DMRS configurations 710-730 is the distribution of resource elements in the time domain. In particular, each CDM group of the first DMRS configuration 710 uses non-consecutive resource elements in the time domain within a PRB, whereas each CDM group of the second DMRS configuration 720 uses consecutive resource elements in the time domain within a PRB. In the third DMRS configuration 730, consecutive and non-consecutive resource elements in the time domain within a PRB are used across the CDM groups.

Applicable to all three DMRS configurations 710-703, the DMRS configuration type 1 continues to use a total of two CDM groups, shown in FIG. 7 as "CDM group 0" with vertically crossed rectangles and "CDM group 1" with diagonally crossed rectangles. With the use of FD-OCC of length six along with a double symbol DMRS, each CDM group uses six resource elements in the frequency domain and two symbols in the time domain within a PRB. As such, for DMRS configuration type 1, twenty-four DMRS ports can be supported with an FD-OCC of length six, a double symbol DMRS, and a TD-OCC of length two.

Although not shown in FIG. 7, the use of FD-OCC of length six along with a single symbol DMRS is possible. In this case, each CDM group uses six resource elements in the frequency domain and one symbol in the time domain within a PRB. As such, for DMRS configuration type 1, twelve DMRS ports can be supported with an FD-OCC of length six, a single symbol DMRS, and a TD-OCC of length two.

In the first DMRS configuration 710, each CDM group takes either "K" even or "K" odd resource elements in the PRB. For instance, one CDM group occupies the six even resource elements in the frequency domain, whereas the other CDM group occupies the six odd resource elements in the frequency domain. In the illustration of FIG. 6, "CDM group 0" occupies the six even resource elements of the PRB (e.g., at sub-carriers twelve, ten, eight, six, four, and two). "CDM group 1" occupies the six odd resource elements of the PRB (e.g., at sub-carriers eleven, nine, seven, five, three, and one).

In the second DMRS configuration 720, each CDM group takes a consecutive number "K" of resource elements in the PRB. For instance, one CDM group occupies six contiguous resource elements in the frequency domain, whereas the other CDM group occupies the next six contiguous resource elements in the frequency domain. In the illustration of FIG. 6, "CDM group 0" occupies the top six resource elements of the PRB (e.g., at sub-carriers twelve, eleven, ten, nine, eight, and seven). "CDM group 1" occupies the next six resource elements of the PRB (e.g., at sub-carriers six, five, four, three, two, and one).

In the third DMRS configuration 720, one CDM group takes a consecutive number "K" of resource elements in the PRB, whereas the other group takes two non-consecutive sets, each including a subset of consecutive resources elements in the PRB. For instance, one CDM group occupies six contiguous resource elements in the frequency domain, whereas the other CDM group occupies the two non-contiguous sets resource elements in the frequency domain, each set occupying three contiguous resource elements in the frequency domain. In the illustration of FIG. 6, "CDM group 0" occupies the top three resource elements and bottom three resource elements of the PRB (e.g., at sub-carriers twelve, eleven, ten, three, two, and one). "CDM group 1" occupies the middle six resource elements of the PRB (e.g., at sub-carriers nine, eight, seven, six, five, and four).

The first DMRS configuration 710 can provide better back-forward compatibility. In comparison, the other town DMRS configurations 720 and 730 can be more robust to frequency selective fading channels.

Referring back to FIGS. 5-7, for at least CP-OFDM, the number of DMRS ports can be increased by increasing the number of DMRS ports supported by each CDM group. The same number of CDM groups may be used (e.g., two CDM groups for DMRS mapping type 1 and three CDM groups for DMRS mapping type 2). However, the number of DMRS ports is increased per CDM group. This increase can be made by using FD-OCC of length three, instead of FD-OCC two, to support up to three DMRS ports for single symbol DMRS per CDM group. This increase can be made by using FD-OCC of length six, instead of FD-OCC two, to support up to six DMRS ports for single symbol DMRS per CDM group. The TD-OCC's length can remain to be two.

Furthermore, multiple options exist for at least CP-OFDM for using FD-OCC three or FD-OCC six to increase the number of DMRS ports. In a first option, FD-OCC of length three and/or six is applicable only for DMRS configuration type 1. The reason for this option relates to the repetition of CDM groups when only two CDM groups are used (e.g., as in DMRS configuration type 1) as described herein above. A second option is that FD-OCC of length three and/or six is applicable to DMRS configuration type 1 and FD-OCC of length three (and possibly of six with a selection of a subset of FD-OCC sequences described below) is applicable to DMRS configuration type 2.

Figure 8:
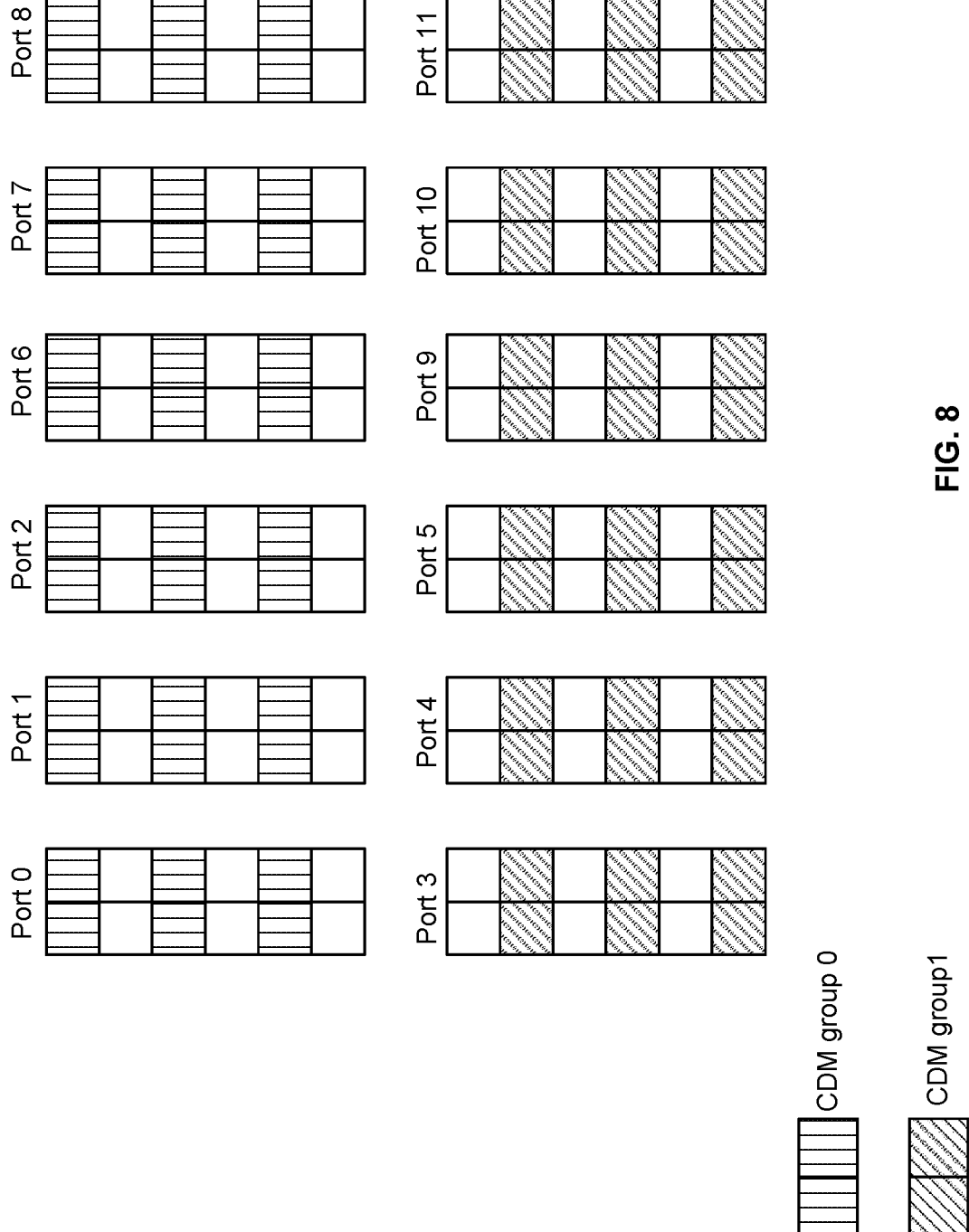
FIG. 8 illustrates an example of DMRS ports, in accordance with some embodiments.

FIG. 8 illustrates an example 800 of DMRS ports, in accordance with some embodiments. The DMRS ports correspond to the FD-OCC that is used (which can be of length three or six). To understand these examples of DMRS ports, the use of the related FD-OCC sequences is explained herein next.

When FD-OCC of length three or six is used to increase the number of DMRS ports per CDM group, the FD-OCC sequence is multiplied on the DRMS sequence transmitted on each resource element in each CDM group. To illustrate, consider first the example of FD-OCC of length three. Thereafter, consider the example of FD-OCC of length six.

In the example of FD-OCC of length three, assume for a particular CDM group with three resource elements, the DMRS sequence is $\{d_0, d_1, d_2\}$, mapping to each resource element correspondingly. An FD-OCC of length three sequence is multiplied on top of the DMRS sequence. This multiplication can be expressed as $\{f_0{}^i{}^*d_0, f_1{}^i{}^*d_1, f_2{}^i{}^*d_2\}$, i=0, 1, 2. $\{f_0{}^i, f_1{}^i, f_2{}^i\}$, i=0, 1, 2 is the $i^{th}$ FD-OCC sequence. For FD-OCC of length three, there are three orthogonal FD-OCC sequences, each sequence with three entries. Each of these sequences can be based on a discrete Fourier transform (DFT) sequence with phases being multiple of 120° degree: $f_k{}^i = \exp\{-2j{}^*\pi{}^*i{}^*k/3\}$, i=0, 1, 2, k=0, 1, 2. As such, three FD-OCC sequences are used, each having three entries, and correspond to a three-by-three matrix, where each row is orthogonal to the other two rows.

In the example of FD-OCC of length six, assume for a particular CDM group with six resource elements, the DMRS sequence is $\{d_0, d_1, d_2, d_3, d_4, d_5\}$, mapping to each resource element correspondingly. An FD-OCC of length six sequence is multiplied on top of the DMRS sequence. This multiplication can be expressed as $\{f_0{}^i{}^*d_0, f_1{}^i{}^*d_1, f_2{}^i{}^*d_2, f_3{}^i{}^*d_3, f_4{}^i{}^*d_4, f_5{}^i{}^*d_5\}$, i=0, 1, 2, 3, 4, 5. $\{f_0{}^i, f_1{}^i, f_2{}^i, f_3{}^i, f_4{}^i, f_5{}^i\}$, i=0, 1, 2, 3, 4, 5 is the $i^{th}$ FD-OCC sequence. For FD-OCC of length six, there are six orthogonal FD-OCC sequences, each sequence with six entries. Each of these sequences can be based on a DFT sequence with phases being multiple of 60° degree: $f_k{}^i = \exp\{-2j{}^*\pi{}^*i{}^*k/6\}$, i=0, 1, 2, 3, 4, 5, k=0, 1, 2, 3, 4, 5. As such, six FD-OCC sequences are used, each having six entries, and correspond to a six-by-six matrix, where each row is orthogonal to the other two rows.

When FD-OCC of length six is used to increase the number of DMRS ports per CDM group, six orthogonal FD-OCC sequences can be created, as described herein above. However, only a subset of six orthogonal FD-OCC sequences may be selected to be used for actual DMRS ports, for example, to support only four DMRS ports per CDM group, four FD-OCC sequences can be selected out of the six FD-OCC sequences. In this case, the selection can default to using two specific FD-OCC sequences for backward compatibility, and the selection of the remaining two FD-OCC sequences can remain flexible. For instance, the following two sequences are selected by default: a first FD-OCC sequence of $\{+1, +1, +1, +1, +1, +1\}$ and a second FD-OCC sequence of $\{+1, -1, +1, -1, +1, -1\}$. The first FD-OCC sequence can be used for backward compatible scheduling (e.g., co-schedule with legacy UE using FD-OCC of length two sequence $\{+1, -1\}$). The second FD-OCC sequence can also be used for backward compatible scheduling (e.g., co-schedule with legacy UE using FD-OCC of length two sequence $\{+1, +1\}$).

Given the orthogonality of the used FD-OCC sequences of length three or six, different DMRS ports can be achieved, whereby DRMS transmissions across the ports are orthogonal to each other. Referring to the example 800 of FIG. 8, the DMRS ports corresponds to the first DMRS configuration 710 of FIG. 7 (e.g., DMRS configuration type 1, double symbol DMRS. FD-OCC of length three, non-consecutive resource element distribution). DMRS ports "0," "1", "2," "6," "7," and "8" correspond to "CDM group 0," whereas DMRS ports "3," "4", "5," "9," "10," and "11" correspond to "CDM group 1."

FIG. 9 illustrates an example of using TD-OCCs, in accordance with some embodiments. A double symbol DMRS can be configured, and a TD-OCC of length two is used to double the number of DMRS ports relative to a single symbol DMRS configuration. Further, DMRS can be repeated in multiple locations within a slot, where each location corresponds to two symbols (e.g., for the double symbol DMRS configuration) or one symbol (e.g., single symbol DMRS configuration). The DMRS locations are defined in table 7.4.1.1.2-3 of 3GPP technical specification 38.211 V17.2.0. This table is copied herein below for ease of reference.

| | DM-RS positions ĺ | | | | | | | |
|---|---|---|---|---|---|---|---|---|
| | PDSCH mapping type A dmrs-AdditionalPosition | | | | PDSCH mapping type B dmrs-AdditionalPosition | | | |
| $l_d$ in | pos0 | pos1 | pos2 | pos3 | pos0 | pos1 | pos2 | pos3 |
| symbols | | | | | | | | |
| 2 | — | — | — | — | $l_0$ | $l_0$ | $l_0$ | $l_0$ |
| 3 | $l_0$ | $l_0$ | $l_0$ | $l_0$ | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0, 4$ | $l_0, 4$ | $l_0, 4$ |
| 6 | $l_0$ | $l_0$ | $l_0$ | $l_0$ | $l_0$ | $l_0, 4$ | $l_0, 4$ | $l_0, 4$ |
| 7 | $l_0$ | $l_0$ | $l_0$ | $l_0$ | $l_0$ | $l_0, 4$ | $l_0, 4$ | $l_0, 4$ |
| 8 | $l_0$ | $l_0, 7$ | $l_0, 7$ | $l_0, 7$ | $l_0$ | $l_0, 6$ | $l_0, 3, 6$ | $l_0, 3, 6$ |
| 9 | $l_0$ | $l_0, 7$ | $l_0, 7$ | $l_0, 7$ | $l_0$ | $l_0, 7$ | $l_0, 4, 7$ | $l_0, 4, 7$ |
| 10 | $l_0$ | $l_0, 9$ | $l_0, 6, 9$ | $l_0, 6, 9$ | $l_0$ | $l_0, 7$ | $l_0, 4, 7$ | $l_0, 4, 7$ |
| 11 | $l_0$ | $l_0, 9$ | $l_0, 6, 9$ | $l_0, 6, 9$ | $l_0$ | $l_0, 8$ | $l_0, 4, 8$ | $l_0, 3, 6, 9$ |
| 12 | $l_0$ | $l_0, 9$ | $l_0, 6, 9$ | $l_0, 5, 8, 11$ | $l_0$ | $l_0, 9$ | $l_0, 5, 9$ | $l_0, 3, 6, 9$ |
| 13 | $l_0$ | $l_0, l_1$ | $l_0, 7, 11$ | $l_0, 5, 8, 11$ | $l_0$ | $l_0, 9$ | $l_0, 5, 9$ | $l_0, 3, 6, 9$ |
| 14 | $l_0$ | $l_0, l_1$ | $l_0, 7, 11$ | $l_0, 5, 8, 11$ | — | — | — | — |

Per this table, up to three additional locations within a slot are possible (e.g., as configured by dmrs-AdditionalPosition via RRC signaling), and each of the additional locations can include two DMRS symbols. FIG. 9 illustrates a first use 910 of one additional location "7" (e.g., corresponding to entry $l_d$ of "8" in the above table"). As illustrated, two DMRS symbols are sent at symbols "0" and "1" (corresponding to location $l_0$). Two additional DMRS symbols are sent at symbols "7" and "8" (corresponding to location $l_d$ of "7").

For a DMRS configuration type 1, with an FD-OCC of length two, the first two DMRS symbols "0" and "1" correspond to DMRS ports "0" through "7." The next two DMRS symbols "7" and "8" are a repetition and, thus, also correspond to DMRS ports "0" through "7."

For a DMRS configuration type 2, with an FD-OCC of length two, the first two DMRS symbols "0" and "1" correspond to DMRS ports "0" through "11." The next two DMRS symbols "7" and "8" are a repetition and, thus, also correspond to DMRS ports "0" through "11."

When one or more additional DMRS locations are configured by dmrs-AdditionalPosition, a larger TD-OCC can be used to create more DMRS ports. For example, with an FD-OCC of length three or six, it may be possible to also apply TD-OCC of length two or longer to the additional DMRS locations (rather than merely the DMRS symbols themselves). FIG. 9 illustrates a second use 920 of the additional location "7," where TD-OCC of length two is applied to the first DMRS location $l_0$ and the second DMRS location $l_d$ (where "$l_d$=7"), along with FD-OCC of length three. Two TD-OCC sequences are defined, each having two entries: $\{+1, +1\}$ and $\{+1, -1\}$. The first TD-OCC sequence of $\{+1, +1\}$ is applied to the two DMRS locations. The second TD-OCC sequence of $\{+1, -1\}$ is also applied to the two DMRS locations For a DMRS configuration type 1, with an FD-OCC of length two, the first two DMRS symbols "0" and "1" correspond to DMRS ports "0" through "15," whereby ports "0" through "7" correspond to the first TD-OCC sequence, and ports "8" through "15" correspond to the second TD-OCC sequence. Although the next two DMRS symbols "7" and "8" are a repetition, given the used TD-OCC sequences, they are used to distinguish between the ports, whereby ports "0" through "7" correspond to the first TD-OCC sequence, and ports "8" through "15" correspond to the second TD-OCC sequence. As such, in totality, when the DMRS symbols "0," "1", "7," and "8" are processed, it may be possible to measure DMRSs on DMRS ports "0" through "15" given the orthogonality of the two TD-OCC sequences.

For a DMRS configuration type 2, with an FD-OCC of length two, the first two DMRS symbols "0" and "1" correspond to DMRS ports "0" through "23," whereby ports "0" through "11" correspond to the first TD-OCC sequence, and ports "12" through "23" correspond to the second TD-OCC sequence. Although the next two DMRS symbols "7" and "8" are a repetition, given the used TD-OCC sequences, they are used to distinguish between the ports, whereby ports "0" through "11" correspond to the first TD-OCC sequence, and ports "12" through "23" correspond to the second TD-OCC sequence. As such, in totality, when the DMRS symbols "0," "1", "7," and "8" are processed, it may be possible to measure DMRSs on DMRS ports "0" through "23" given the orthogonality of the two TD-OCC sequences.

The above illustrates the use of TD-OCC of length two for one additional location. The length of the used TD-OCC can depend on the number of additional locations. For instance, with two or three additional locations, the TD-OCC's length can be three or four, respectively. Further, such a use of the TD-OCC can be with FD-OCC of length three, six, or some other length.

For example, when extended TD-OCC of length two is used (e.g., extending TD-OCC to cover two DMRS locations), this TD-OCC use may be only applicable when dmrs-AdditionalPosition="pos1" or "pos3." The TD-OCC sequences can be $\{+1, +1\}$, $\{+1, -1\}$.

In another example, when extended TD-OCC of length three is used (e.g., extending TD-OCC to cover three DMRS locations), this TD-OCC use may be only applicable when dmrs-AdditionalPosition is not configured. The TD-OCC sequence can be $\{+1, +1, +1\}$, $\{+1, \exp(-2j*\pi/3), \exp(-4j*\pi/3)\}$, $\{+1, \exp(-4j*\pi/3), \exp(-2j*\pi/3)\}$.

In yet another example, when extended TD-OCC of length four is used (e.g., extending TD-OCC to cover four DMRS locations), this TD-OCC use may be only applicable when dmrs-AdditionalPosition="pos3". The TD-OCC sequence can be, in one option, $\{+1, +1, +1, +1\}$, $\{+1, -1, +1, -1\}$, $\{+1, +1, -1, -1\}$, $\{+1, -1, -1, +1\}$ or, in another option, $\{+1, +1, +1, +1\}$, $\{+j, -1, -j, +1\}$, $\{+1, -1, +1, -1\}$, $\{-j, -1, +j, +1\}$.

As further illustrated in the second use 920 of FIG. 9, a minimum relaxation time may be needed. In particular, because measuring the DMRSs on DMRS ports "0" through "15" (e.g., for DMRS configuration type 1) or on DMRS ports "0" through "23" (e.g., for DMRS configuration type 2) may not be possible until DMRS symbols "0," "1," "7," and "8" are received, it may not be possible to start processing data symbols received beforehand (e.g., at symbols "2" through 6") until after the DMRS measuring is complete (e.g., until after DMRS symbol "8"). As such, the relaxation time is equal or larger than a number of symbols between a last DMRS symbol at the second DMRS location and a first data symbol after the first DMRS location (e.g., seven symbols in the illustration of FIG. 9).

As such, when larger TD-OCC is applied across multiple DMRS locations to increase the number of DMRS ports, the UE processing time (e.g., the UE PDSCH processing time in case of DMRS transmissions for PDSCH) can be further relaxed. In the PDSCH example, the UE PDSCH processing time can be the minimum time required between the end of the PDSCH and the beginning of the HARQ-ACK. The relaxation time can be a function of the subcarrier spacing of PDSCH and/or PUCCH that carries the HARQ-ACK. The relaxation time can be predefined in a technical specification (e.g., a 3GPP technical specification) with which the UE and the base station need to comply. Additionally or alternatively, the relaxation time can be based on UE capability reporting. In this case, when the UE reports its capability to the base station (e.g., during an RRC procedure), the reported capability (e.g., via RRC signaling) can indicate the minimum time required.

Referring again to FIG. 9, the use of TD-OCC for the additional DMRS location(s) can be successful when characteristics of the underlying channel remain significantly the same. Otherwise, channel fading may occur. If intra-slot frequency hopping is permitted (e.g., hopping between different subcarriers is allowed within a same slot), such characteristics may change to a point where the use of TD-OCC may no longer be successful. As such, the use of the TD-OCC for DMRS location can be enabled when intra-slot frequency hopping is disabled, or vice versa, where the use of intra-slot frequency hopping can be enabled when the use of the TD-OCC for DMRS locations is disabled.

In an example, the TD-OCC for DMRS location is used for UL communications. For instance, DMRSs are used for PUSCH. When intra-slot PUSCH (or other uplink channel) frequency hopping is configured, the extended TD-OCC cannot be applied across different DMRS locations in different frequency hopping occasions in the same slot.

Also, with the use of TD-OCC for the additional DMRS location(s), the same locked phase can be used for the DMRS transmissions within the same slot. This can be the case before the channel characteristics may be assumed to significantly remain the same across the slot. In other words, phase continuity may be assumed across all the DMRS locations in the same extended TD-OCC.

FIG. 10 illustrates an example of an operational flow/algorithmic structure 1000 implemented by a UE for DMRS communications, in accordance with some embodiments. Components of the UE, such as one or more processors thereof, can implement the operational flow/algorithmic structure 1000. Such components are further described in FIG. 13.

In an example, the operational flow/algorithmic structure 1000 includes, at step 1002, receiving, from a base station, time domain and frequency domain demodulation reference signal (DMRS) parameters indicating a symbol length and a configuration type, the symbol length being a single symbol DMRS or a double symbol DMRS, the configuration type being a DMRS configuration type 1 or a DMRS configuration type 2. For instance, the time domain and frequency domain parameters are indicating via RRC signaling between the UE and the base station. The time domain DMRS parameters can indicate the DMRS configuration in the time domain, whereas the frequency domain DMRS parameters can indicate the DMRS configuration in the frequency domain. In the PDSCH use case, the time domain DMRS parameters include a PDSCH symbol allocation, a mapping type, a DMRS type A position, a DMRS length, and an DMRS additional position. The frequency domain DMRS parameters include the DMRS configuration type and DMRS antenna ports. Further, via RRC signaling, the UE can indicate its processing capability and the base station can indicate, in configuration information, a relaxation time to use when TD-OCC is applied to DMRS locations.

In an example, the operational flow/algorithmic structure 1000 includes, at step 1004, determining that, for uplink DMRS communications or downlink DMRS communications with the base station, a frequency domain orthogonal cover code (FD-OCC) of length three or six is to be used. The length of the FD-OCC code can be indicated by RRC signaling (e.g., as one of the time domain and frequency domain DMRS parameters), DCI, or media access control (MAC) control element (CE). Alternatively, the UE can pre-store information indicating the length, where this information is pre-stored based on a technical specification with which the UE and the base station may comply. Similarly, the specific FD-OCC sequences can be configured or pre-stored. Similarly, the specific FD-OCC sequences can be configured for the UE or pre-stored by the UE.

In an example, the operational flow/algorithmic structure 1000 includes, at step 1006, performing the uplink DMRS communications or the downlink DMRS communications using the FD-OCC, symbol length, and configuration type. For instance, on the downlink, a PDSCH channel is used. DMRSs for PDSCH are received by the UE using the relevant DMRS ports based on the FD-OCC and the time domain and frequency domain DMRS parameters. The DMRSs are measured and used for further processing of PDSCH data. On the uplink, a PUSCH channel is used. DMRSs for PUSCH are sent by the UE using the relevant DMRS ports based on the FD-OCC and the time domain and frequency domain DMRS parameters.

FIG. 11 illustrates an example of an operational flow/algorithmic structure implemented by a base station for DMRS communications, in accordance with some embodiments. Components of the base station, such as one or more processors thereof, can implement the operational flow/algorithmic structure 1100. Such components are further described in FIG. 14.

In an example, the operational flow/algorithmic structure 1100 includes, at step 1102, sending, to a user equipment (UE), time domain and frequency domain demodulation reference signal (DMRS) parameters indicating a symbol length and a configuration type, the symbol length being a single symbol DMRS or a double symbol DMRS, the configuration type being a DMRS configuration type 1 or a DMRS configuration type 2. For instance, the time domain and frequency domain parameters are indicating via RRC signaling between the UE and the base station. The time domain DMRS parameters can indicate the DMRS configuration in the time domain, whereas the frequency domain DMRS parameters can indicate the DMRS configuration in the frequency domain. In the PDSCH use case, the time domain DMRS parameters include a PDSCH symbol allocation, a mapping type, a DMRS type A position, a DMRS length, and an DMRS additional position. The frequency domain DMRS parameters include the DMRS configuration type and DMRS antenna ports. Further, via RRC signaling, the UE can indicate its processing capability and the base station can indicate, in configuration information, a relaxation time to use when TD-OCC is applied to DMRS locations.

In an example, the operational flow/algorithmic structure 1100 includes, at step 1104, determining that, for uplink DMRS communications or downlink DMRS communications with the UE a frequency domain orthogonal cover code (FD-OCC) of length three or six is to be used. Generally, the base station can pre-store information indicating the length and the related FD-OCC sequences based on a technical specification with which the UE and the base station may comply. This length of the FD-OCC code can be indicated by RRC signaling (e.g., as one of the time domain and frequency domain DMRS parameters), DCI, or media access control (MAC) control element (CE) to the UE. Alternatively, the UE can also pre-store information indicating the length, where this information is pre-stored based on the technical specification with which the UE and the base station may comply. Similarly, the specific FD-OCC sequences can be configured for the UE or pre-stored by the UE.

In an example, the operational flow/algorithmic structure 1100 includes, at step 1106, performing the uplink DMRS communications or the downlink DMRS communications using the FD-OCC, symbol length, and configuration type. For instance, on the downlink, a PDSCH channel is used. DMRSs for PDSCH are sent by the base station using the relevant DMRS ports based on the FD-OCC and the time domain and frequency domain DMRS parameters. On the uplink, a PUSCH channel is used. DMRSs for PUSCH are received by the base station using the relevant DMRS ports based on the FD-OCC and the time domain and frequency domain DMRS parameters. The DMRSs are measured and used for further processing of PUSCH data.

Figure 12:
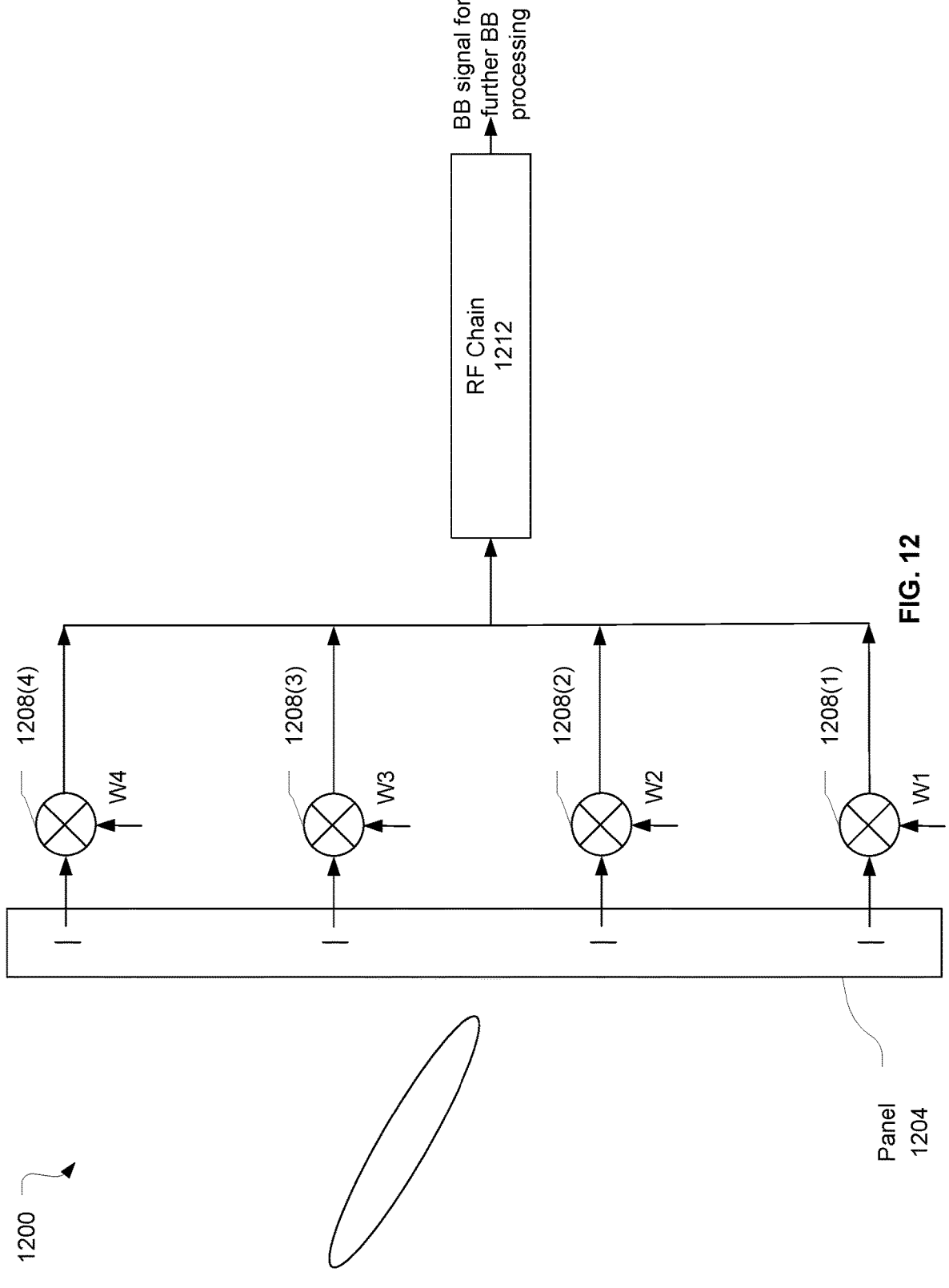
FIG. 12 illustrates an example of receive components, in accordance with some embodiments.

FIG. 12 illustrates receive components 1200 of the UE 104, in accordance with some embodiments. A device, such as one described in any of the above figures, can include similar receive components. The receive components 1200 may include an antenna panel 1204 that includes a number of antenna elements. The panel 1204 is shown with four antenna elements, but other embodiments may include other numbers.

The antenna panel 1204 may be coupled to analog beamforming (BF) components that include a number of phase shifters 1208(1)-1208(4). The phase shifters 1208(1)-1208(4) may be coupled with a radio-frequency (RF) chain 1212. The RF chain 1212 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1208(1)-1208(4) to provide a receive beam at the antenna panel 1204. These BF weights may be determined based on the channel-based beamforming.

Figure 13:
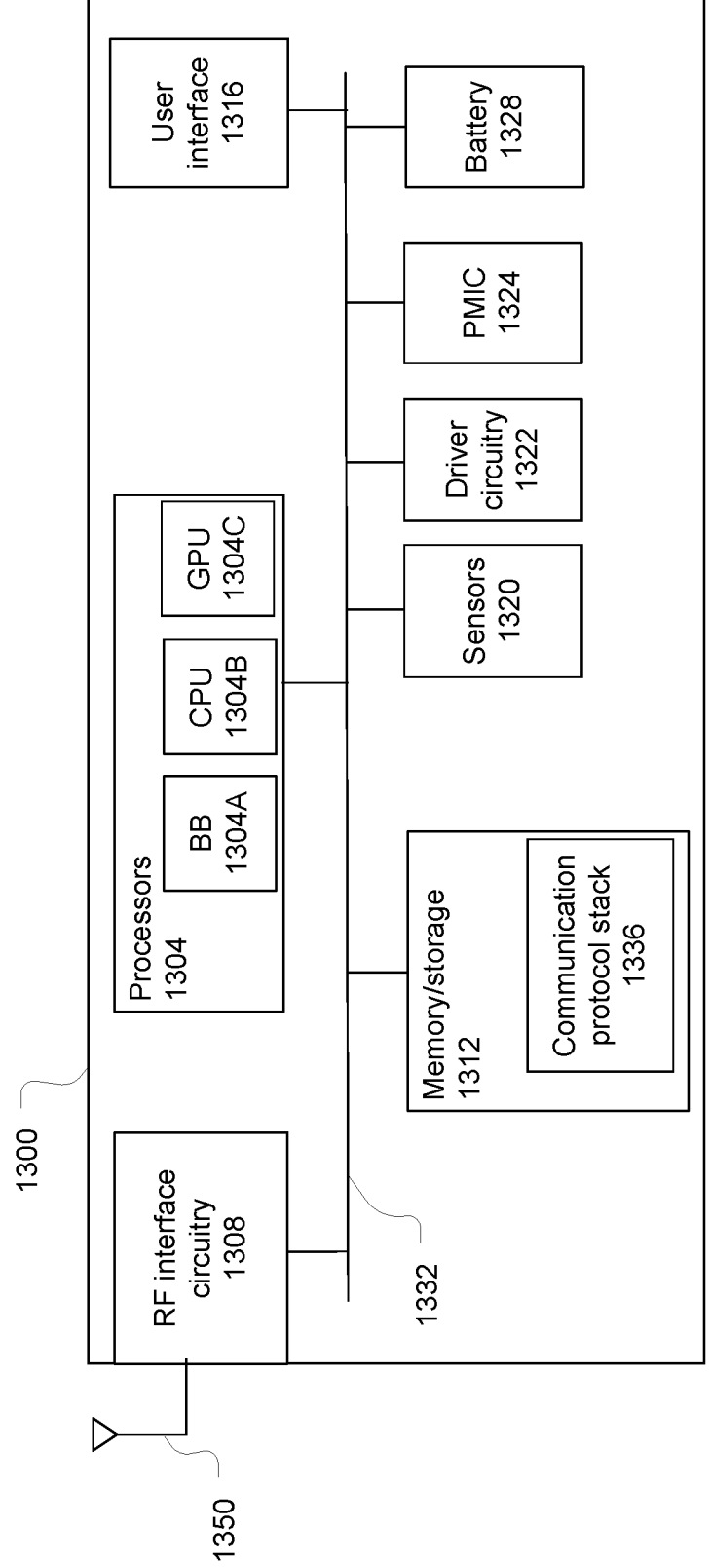
FIG. 13 illustrates an example of a UE, in accordance with some embodiments.

FIG. 13 illustrates a UE 1300, in accordance with some embodiments. The UE 1300 may be similar to and substantially interchangeable with UE 104 of FIG. 1. A device, such as one described in any of the above figures, can include similar components, including for instance, processors, memory, and RF interface circuitry.

Similar to that described above with respect to UE 104, the UE 1300 may be any mobile or non-mobile computing device, such as mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1300 may include processors 1304, RF interface circuitry 1308, memory/storage 1312, user interface 1316, sensors 1320, driver circuitry 1322, power management integrated circuit (PMIC) 1324, and battery 1328. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangements of the components shown may occur in other implementations.

The components of the UE 1300 may be coupled with various other components over one or more interconnects 1332, which may represent any type of interface, input/output, bus (local, system, or expansion), transmission line, trace, optical connection, etc., that allows various circuit components (on common or different chips or chipsets) to interact with one another.

The processors 1304 may include processor circuitry, such as baseband processor circuitry (BB) 1304A, central processor unit circuitry (CPU) 1304B, and graphics processor unit circuitry (GPU) 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some embodiments, the baseband processor circuitry 1304A may access a communication protocol stack 1336 in the memory/storage 1312 to communicate over a 3GPP compatible network. In general, the baseband processor circuitry 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1308.

The baseband processor circuitry 1304A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1304A may also access group information from memory/storage 1312 to determine search space groups in which a number of repetitions of a PDCCH may be transmitted.

The memory/storage 1312 may include any type of volatile or non-volatile memory that may be distributed throughout the UE 1300. In some embodiments, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1308 may include transceiver circuitry and a radio frequency front module (RFEM) that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1350 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1350.

In various embodiments, the RF interface circuitry 1308 may be configured to transmit/receive signals in a manner compatible with NR access technologies.

The antenna 1350 may include a number of antenna elements that each convert electrical signals into radio waves to travel through the air and to convert received radio waves into electrical signals. The antenna elements may be arranged into one or more antenna panels. The antenna 1350 may have antenna panels that are omnidirectional, directional, or a combination thereof to enable beamforming and multiple input, multiple output communications. The antenna 1350 may include microstrip antennas, printed antennas fabricated on the surface of one or more printed circuit boards, patch antennas, phased array antennas, etc. The antenna 1350 may have one or more panels designed for specific frequency bands including bands in FR1 or FR2.

The user interface circuitry 1316 includes various input/output (I/O) devices designed to enable user interaction with the UE 1300. The user interface 1316 includes input device circuitry and output device circuitry. Input device circuitry includes any physical or virtual means for accepting an input, including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs) and multi-character visual outputs), or more complex outputs, such as display devices or touchscreens (for example, liquid crystal displays (LCDs), LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensor circuitry 1320 and control and allow access to sensor circuitry 1320, drivers to obtain actuator positions of electro-mechanic components or control and allow access to the electro-mechanic components, a camera driver to control and allow access to an embedded image capture device, audio drivers to control and allow access to one or more audio devices.

The PMIC 1324 may manage power provided to various components of the UE 1300. In particular, with respect to the processors 1304, the PMIC 1324 may control power-source selection, voltage scaling, battery charging, or DC-to-DC conversion.

In some embodiments, the PMIC 1324 may control, or otherwise be part of, various power saving mechanisms of the UE 1300. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1300 may power down for brief intervals of time and thus save power. If there is no data traffic activity for an extended period of time, then the UE 1300 may transition off to an RRC_Idle state, where it disconnects from the network and does not perform operations, such as channel quality feedback, handover, etc. The UE 1300 goes into a very low power state and it performs paging where again it periodically wakes up to listen to the network and then powers down again. The UE 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1328 may power the UE 1300, although in some examples the UE 1300 may be mounted deployed in a fixed location and may have a power supply coupled to an electrical grid. The battery 1328 may be a lithium-ion battery, a metal-air battery, such as a zinc-air battery, an aluminum-air battery, a lithium-air battery, and the like. In some implementations, such as in vehicle-based applications, the battery 1328 may be a typical lead-acid automotive battery.

Figure 14:
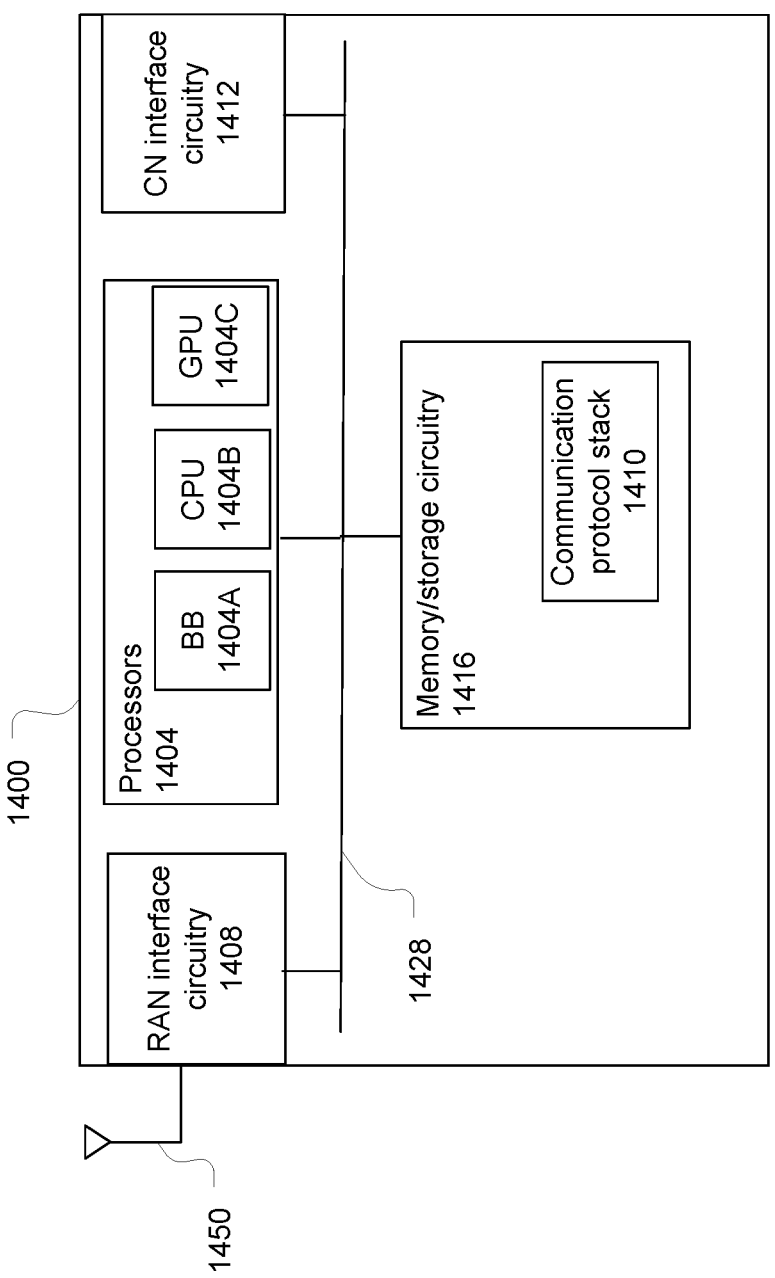
FIG. 14 illustrates an example of a base station, in accordance with some embodiments.

FIG. 14 illustrates a gNB 1400, in accordance with some embodiments. The gNB 1400 may be similar to and substantially interchangeable with the gNB 108 of FIG. 1.

The gNB 1400 may include processors 1404, RAN interface circuitry 1408, core network (CN) interface circuitry 1412, and memory/storage circuitry 1416.

The components of the gNB 1400 may be coupled with various other components over one or more interconnects 1428.

The processors 1404, RAN interface circuitry 1408, memory/storage circuitry 1416 (including communication protocol stack 1410), antenna 1450, and interconnects 1428 may be similar to like-named elements shown and described with respect to FIG. 13.

The CN interface circuitry 1412 may provide connectivity to a core network, for example, a Fifth Generation Core network (5GC) using a 5GC-compatible network interface protocol, such as carrier Ethernet protocols, or some other suitable protocol. Network connectivity may be provided to/from the gNB 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 includes a method implemented by a user equipment (UE), the method comprising: receiving, from a base station, time domain and frequency domain demodulation reference signal (DMRS) parameters indicating a symbol length and a configuration type, the symbol length being a single symbol DMRS or a double symbol DMRS, the configuration type being a DMRS configuration type 1 or a DMRS configuration type 2; determine that, for uplink DMRS communications or downlink DMRS communications with the base station, a frequency domain orthogonal cover code (FD-OCC) of length three or six is to be used; and perform the uplink DMRS communications or the downlink DMRS communications using the FD-OCC, symbol length, and configuration type.

Example 2 includes a method implemented by a base station of a network, the method comprising: sending, to a user equipment (UE), time domain and frequency domain demodulation reference signal (DMRS) parameters indicating a symbol length and a configuration type, the symbol length being a single symbol DMRS or a double symbol DMRS, the configuration type being a DMRS configuration type 1 or a DMRS configuration type 2; determining that, for uplink DMRS communications or downlink DMRS communications with the UE a frequency domain orthogonal cover code (FD-OCC) of length three or six is to be used; and performing the uplink DMRS communications or the downlink DMRS communications using the FD-OCC, symbol length, and configuration type.

Example 3 includes the method of any preceding example, wherein the FD-OCC of length three or six corresponds to a code division multiplexing (CDM) group of the configuration type associated with, in a frequency domain, three or more resource elements of a physical resource block before repetition of the CDM group in the frequency domain.

Example 4 includes the method of any preceding example, wherein the FD-OCC of length three or six is to be used only for the DMRS configuration type 1.

Example 5 includes the method of any preceding example 1-3, wherein the FD-OCC of length three or six is to be used for the DMRS configuration type 1 and the DMRS configuration type 2.

Example 6 includes the method of any preceding example, wherein the FD-OCC of length three or six corresponds to a code division multiplexing (CDM) group of the configuration type associated with, in a frequency domain, K even resource elements or K odd resource elements of a physical resource block, wherein K is equal to three or six.

Example includes 7 the method of any preceding example, wherein the FD-OCC of length three or six corresponds to a code division multiplexing (CDM) group of the configuration type associated with, in a frequency domain, K consecutive resource elements of a physical resource block, wherein K is equal to three or six.

Example 8 includes the method of any preceding example, wherein the uplink DMRS communications or the downlink DMRS communications are performed based on a multiplication of an FD-OCC sequence and a DMRS sequence that is transmitted on each resource element in each code division multiplexing (CDM) group of the configuration type.

Example 9 includes the method of example 8, wherein the FD-OCC sequence is based on a discrete Fourier transform (DFT) sequence with phases being multiple of 120° degree for the length of three and 60° for the length of six.

Example 10 includes the method of any preceding example, wherein the FD-OCC of length three corresponds to three FD-OCC sequences each having three entries.

Example 11 includes the method of any preceding example 1-9, wherein the FD-OCC of length six corresponds to six FD-OCC sequences each having six entries.

Example 12 includes the method of example 11, wherein the uplink DMRS communications or the downlink DMRS communications are performed based on a selection of a subset of the six FD-OCC sequences, wherein the subset includes a first FD-OCC sequence of $\{+1, +1, +1, +1, +1, +1\}$ and a second FD-OCC sequence of $\{+1, -1, +1, -1, +1, -1\}$.

Example 13 includes the method of example 12, wherein the first FD-OCC sequence is used with a first co-scheduled DMRS communication that uses FD-OCC of length two and a third FD-OCC sequence of $\{+1, -1\}$, and wherein the second FD-OCC sequence is used with a second co-scheduled DMRS communication that uses the FD-OCC of length two and a fourth FD-OCC sequence of $\{+1, +1\}$.

Example 14 includes the method of any preceding example, wherein the time domain and frequency domain DMRS parameters further indicate a plurality of DMRS locations each being of the symbol length, and wherein the method further comprises: determining a time domain orthogonal cover code (TD-OCC) of length at least two to be applied to the plurality of DMRS locations, wherein the uplink DMRS communications or the downlink DMRS communications are performed by further using the TD-OCC.

Example 15 includes the method of example 14, wherein two DMRS locations are configured, and wherein the TD-OCC is of length two and corresponds to a first TD-OCC sequence of $\{+1, +1\}$ applied to the two DMRS locations and to a second TD-OCC sequence of $\{+, -1\}$ applied to the two DMRS.

Example 16 includes the method of example 14, wherein three DMRS locations are configured, and wherein the TD-OCC is of length three and corresponds to a first TD-OCC sequence of $\{+1, +1, +1\}$, a second TD-OCC sequence of $\{+1, \exp(-2j*\pi/3), \exp(-4j*\pi/3)\}$, and a third TD-OCC sequence of $\{+1, \exp(-4j*\pi/3), \exp(-2j*\pi/3)\}$.

Example 17 includes the method of example 14, wherein four DMRS locations are configured, and wherein the TD-OCC is of length four and corresponds to TD-OCC sequences of $\{+1, +1, +1, +1\}$, $\{+1, -1, +1, -1,\}$, $\{+1, +1, -1, -1\}$, and $\{+1, -1, -1, +1\}$.

Example 18 includes the method of example 14, wherein four DMRS locations are configured, and wherein the TD-OCC is of length four and corresponds to TD-OCC sequences of $\{+1, +1, +1, +1\}$, $\{+j, -1, -j, +1,\}$, $\{+1, -1, +1, -1\}$, and $\{-j, -1, +j, +1\}$.

Example 19 includes the method of any preceding example, wherein the time domain and frequency domain DMRS parameters further indicate a plurality of DMRS locations each being of the symbol length, and wherein the uplink DMRS communications or the downlink DMRS communications are performed by further using a time domain orthogonal cover code (TD-OCC) of length at least two to be applied to the plurality of DMRS locations.

Example 20 includes the method of any preceding example, wherein the plurality of DMRS locations includes a first DMRS location and a second DMRS location, and wherein a UE physical downlink shared channel (PDSCH) processing time is relaxed by a relaxation time equal or larger than a number of symbols between a last DMRS symbol at the second DMRS location and a first data symbol after the first DMRS location.

Example 21 includes the method of example 20, wherein the relaxation time is based on a subcarrier spacing of at least one of a PDSCH that carries data or a physical uplink control channel (PUCCH) that carries a hybrid automatic repeat request acknowledgment (HARQ-ACK).

Example 22 includes the method of any preceding example, wherein the TD-OCC is used based on intra-slot physical uplink share channel (PUSCH) hopping not being configured.

Example 23 includes the method of any preceding example, wherein the uplink DMRS communications or the downlink DMRS communications are performed based on a same locked phase.

Example 24 includes a UE comprising means to perform one or more elements of a method described in or related to any of the examples 1 and 3-23.

Example 25 includes one or more non-transitory computer-readable media comprising instructions to cause a UE, upon execution of the instructions by one or more processors of the UE, to perform one or more elements of a method described in or related to any of the examples 1 and 3-23.

Example 26 includes a UE comprising logic, modules, or circuitry to perform one or more elements of a method described in or related to any of the examples 1 and 3-23.

Example 27 includes a UE comprising: one or more processors and one or more computer-readable media comprising instructions that, when executed by the one or more processors, cause the one or more processors to perform one or more elements of a method described in or related to any of the examples 1 and 3-23.

Example 28 includes a base station comprising means to perform one or more elements of a method described in or related to any of the examples 2-23.

Example 29 includes one or more non-transitory computer-readable media comprising instructions to cause a base station, upon execution of the instructions by one or more processors of the base station, to perform one or more elements of a method described in or related to any of the examples 2-23.

Example 30 includes a base station comprising logic, modules, or circuitry to perform one or more elements of a method described in or related to any of the examples 2-23.

Example 31 includes a base station comprising: one or more processors and one or more computer-readable media comprising instructions that, when executed by the one or more processors, cause the one or more processors to perform one or more elements of a method described in or related to any of the examples 2-23.

Example 32 includes a system comprising means to perform one or more elements of a method described in or related to any of the examples 1-23.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
   processing circuitry configured to:
      receive, from a base station, time domain and frequency domain demodulation reference signal (DMRS) parameters indicating a symbol length, four DMRS locations, and a configuration type, the symbol length being a single symbol DMRS or a double symbol DMRS, the configuration type being a DMRS configuration type 1 or a DMRS configuration type 2;
      determine that, for uplink DMRS communications or downlink DMRS communications with the base station, a frequency domain orthogonal cover code (FD-OCC) of length three or six and a time domain orthogonal cover code (TD-OCC) are to be used, wherein the TD-OCC is of length four and corresponds to TD-OCC sequences of $\{+1, +1, +1, +1\}$, $\{+1, -1, +1, -1\}$, $\{+1, +1, -1, -1\}$, and $\{+1, -1, -1, +1\}$; and
      perform the uplink DMRS communications or the downlink DMRS communications using the FD-OCC, symbol length, and configuration type; and
   interface circuitry configured to send the uplink DMRS communications or received the downlink DMRS communications.

2. The apparatus of claim 1, wherein the FD-OCC of length three or six corresponds to a code division multiplexing (CDM) group of the configuration type associated with, in a frequency domain, three or more resource elements of a physical resource block before repetition of the CDM group in the frequency domain.

3. The apparatus of claim 1, wherein the FD-OCC of length three or six is to be used only for the DMRS configuration type 1.

4. The apparatus of claim 1, wherein the FD-OCC of length three or six is to be used for the DMRS configuration type 1 and the DMRS configuration type 2.

5. The apparatus of claim 1, wherein the FD-OCC of length three or six corresponds to a code division multiplexing (CDM) group of the configuration type associated with, in a frequency domain, K even resource elements or K odd resource elements of a physical resource block, wherein K is equal to three or six.

6. The apparatus of claim 1, wherein the FD-OCC of length three or six corresponds to a code division multiplexing (CDM) group of the configuration type associated with, in a frequency domain, K consecutive resource elements of a physical resource block, wherein K is equal to three or six.

7. The apparatus of claim 1, wherein the uplink DMRS communications or the downlink DMRS communications are performed based on a multiplication of an FD-OCC sequence and a DMRS sequence that is transmitted on each resource element in each code division multiplexing (CDM) group of the configuration type.

8. The apparatus of claim 7, wherein the FD-OCC sequence is based on a discrete Fourier transform (DFT) sequence with phases being multiple of 120° degree for the length of three and 60° for the length of six.

9. The apparatus of claim 1, wherein the FD-OCC of length three corresponds to three FD-OCC sequences each having three entries.

10. The apparatus of claim 1, wherein the FD-OCC of length six corresponds to six FD-OCC sequences each having six entries.

11. The apparatus of claim 10, wherein the uplink DMRS communications or the downlink DMRS communications are performed based on a selection of a subset of the six FD-OCC sequences, wherein the subset includes a first FD-OCC sequence of $\{+1, +1, +1, +1, +1, +1\}$ and a second FD-OCC sequence of $\{+1, -1, +1, -1, +1, -1\}$.

12. The apparatus of claim 11, wherein the first FD-OCC sequence is used with a first co-scheduled DMRS communication that uses FD-OCC of length two and a third FD-OCC sequence of $\{+1, -1\}$, and wherein the second FD-OCC sequence is used with a second co-scheduled DMRS communication that uses the FD-OCC of length two and a fourth FD-OCC sequence of $\{+1, +1\}$.

13. One or more non-transitory computer-readable storage media storing instructions that, upon execution on a user equipment (UE), configures the UE to perform operations comprising:

receiving, from a base station, time domain and frequency domain demodulation reference signal (DMRS) parameters indicating a symbol length, DMRS locations, and a configuration type, the symbol length being a single symbol DMRS or a double symbol DMRS, the configuration type being a DMRS configuration type 1 or a DMRS configuration type 2;

determining that, for uplink DMRS communications or downlink DMRS communications with the base station, a frequency domain orthogonal cover code (FD-OCC) of length three or six and a time domain orthogonal cover code (TD-OCC) are to be used, wherein the TD-OCC is of length three and corresponds to a first TD-OCC sequence of $\{+1, +1, +1\}$, a second TD-OCC sequence of $\{+1, \exp(-2j*\pi/3), \exp(-4j*\pi/3)\}$, and a third TD-OCC sequence of $\{+1, \exp(-4j*\pi/3), \exp(-2j*\pi/3)\}$; and performing the uplink DMRS communications or the downlink DMRS communications using the FD-OCC, symbol length, and configuration type.

14. The one or more non-transitory computer-readable storage media of claim 13, wherein the operations further comprise:

determining the TD-OCC to be applied to the plurality of DMRS locations, wherein the uplink DMRS communications or the downlink DMRS communications are performed by further using the TD-OCC.

15. A method comprising:

sending, to a user equipment (UE), time domain and frequency domain demodulation reference signal (DMRS) parameters indicating a symbol length, four DMRS locations, and a configuration type, the symbol length being a single symbol DMRS or a double symbol DMRS, the configuration type being a DMRS configuration type 1 or a DMRS configuration type 2;

determining that, for uplink DMRS communications or downlink DMRS communications with the UE a frequency domain orthogonal cover code (FD-OCC) of length three or six and a time domain orthogonal cover code (TD-OCC) are to be used, wherein the TD-OCC is of length four and corresponds to TD-OCC sequences of $\{+1, +1, +1, +1\}$, $\{+j, -1, -j, +1\}$, $\{+1, -1, +1, -1\}$, and $\{-j, -1, +j, +1\}$; and performing the uplink DMRS communications or the downlink DMRS communications using the FD-OCC, symbol length, and configuration type.

16. The method of claim 15, wherein the uplink DMRS communications or the downlink DMRS communications are performed by further using the TD-OCC to be applied to the plurality of DMRS locations.

17. The one or more non-transitory computer-readable storage media of claim 13, wherein the FD-OCC of length three or six is to be used only for the DMRS configuration type 1.

18. The one or more non-transitory computer-readable storage media of claim 13, wherein the FD-OCC of length three or six is to be used for the DMRS configuration type 1 and the DMRS configuration type 2.

19. The one or more non-transitory computer-readable storage media of claim 13, wherein the FD-OCC of length three or six corresponds to a code division multiplexing (CDM) group of the configuration type associated with, in a frequency domain, K even resource elements or K odd resource elements of a physical resource block, wherein K is equal to three or six.

20. The one or more non-transitory computer-readable storage media of claim 13, wherein the FD-OCC of length three or six corresponds to a code division multiplexing (CDM) group of the configuration type associated with, in a frequency domain, K consecutive resource elements of a physical resource block, wherein K is equal to three or six.

* * * * *